(12) United States Patent
Leyvand et al.

(10) Patent No.: US 8,926,431 B2
(45) Date of Patent: Jan. 6, 2015

(54) VISUAL BASED IDENTITY TRACKING

(75) Inventors: Tommer Leyvand, Seattle, WA (US); Mitchell Stephen Dernis, Seattle, WA (US); Jinyu Li, Sammamish, WA (US); Yichen Wei, Beijing (CM); Jian Sun, Beijing (CN); Casey Leon Meekhof, Kirkland, WA (US); Timothy Milton Keosababian, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/410,626

(22) Filed: Mar. 2, 2012

(65) Prior Publication Data

US 2012/0165097 A1    Jun. 28, 2012

Related U.S. Application Data

(63) Continuation of application No. 12/696,282, filed on Jan. 29, 2010.

(51) Int. Cl.
  *A63F 13/00* (2014.01)
  *A63F 9/24* (2006.01)
(52) U.S. Cl.
  CPC ........................................ *A63F 9/24* (2013.01)
  USPC ............................................. 463/36; 463/31
(58) Field of Classification Search
  USPC .............. 463/9, 30–34, 36–43; 382/103, 154; 345/156, 157
  See application file for complete search history.

(56) References Cited

U.S. PATENT DOCUMENTS

| 4,627,620 A | 12/1986 | Yang |
| 4,630,910 A | 12/1986 | Ross et al. |
| 4,645,458 A | 2/1987 | Williams |

(Continued)

FOREIGN PATENT DOCUMENTS

| CN | 101254344 B | 6/2010 |
| EP | 0583061 A2 | 2/1994 |

(Continued)

OTHER PUBLICATIONS

Shivappa, et al., "Person Tracking With Audio-visual Cues Using the Iterative Decoding Framework," IEEE 5th International Conference on Advanced Video and Signal Based Surveillance, 2008, pp. 260-267.

(Continued)

*Primary Examiner* — Milap Shah
(74) *Attorney, Agent, or Firm* — Gregg Wisdom; Judy Yee; Micky Minhas

(57) ABSTRACT

A video game system (or other data processing system) can visually identify a person entering a field of view of the system and determine whether the person has been previously interacting with the system. In one embodiment, the system establishes thresholds, enrolls players, performs the video game (or other application) including interacting with a subset of the players based on the enrolling, determines that a person has become detectable in the field of view of the system, automatically determines whether the person is one of the enrolled players, maps the person to an enrolled player and interacts with the person based on the mapping if it is determined that the person is one of the enrolled players, and assigns a new identification to the person and interacts with the person based on the new identification if it is determined that the person is not one of the enrolled players.

17 Claims, 16 Drawing Sheets

(56) References Cited

U.S. PATENT DOCUMENTS

| | | | |
|---|---|---|---|
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A * | 4/1997 | Oh | 463/8 |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,137,896 A | 10/2000 | Chang et al. | |
| 6,141,463 A | 10/2000 | Covell et al. | |
| 6,142,876 A | 11/2000 | Cumbers | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,184,926 B1 | 2/2001 | Khosravi et al. | |
| 6,188,777 B1 * | 2/2001 | Darrell et al. | 382/103 |
| 6,205,231 B1 | 3/2001 | Isadore-Barreca et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,674,877 B1 | 1/2004 | Jojic | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,896,618 B2 * | 5/2005 | Benoy et al. | 463/25 |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,218,320 B2 | 5/2007 | Gordon et al. | |
| 7,222,078 B2 | 5/2007 | Abelow | |
| 7,227,526 B2 | 6/2007 | Hildreth et al. | |
| 7,227,976 B1 | 6/2007 | Jung | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,372,977 B2 | 5/2008 | Fujimura et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,526,101 B2 | 4/2009 | Avidan | |
| 7,536,032 B2 | 5/2009 | Bell | |
| 7,555,142 B2 | 6/2009 | Hildreth et al. | |
| 7,559,834 B1 * | 7/2009 | York | 463/2 |
| 7,560,701 B2 | 7/2009 | Oggier et al. | |
| 7,570,805 B2 | 8/2009 | Gu | |

(56) References Cited

U.S. PATENT DOCUMENTS

| | | |
|---|---|---|
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2003/0169906 A1 | 9/2003 | Gokturk et al. |
| 2004/0037450 A1 | 2/2004 | Bradski |
| 2005/0192097 A1 | 9/2005 | Farnham |
| 2005/0196018 A1 | 9/2005 | Toyama |
| 2006/0177109 A1 | 8/2006 | Storch |
| 2007/0297645 A1 | 12/2007 | Pace |
| 2008/0026838 A1 | 1/2008 | Dunstan et al. |
| 2008/0030459 A1 | 2/2008 | Kouno |
| 2008/0152191 A1 | 6/2008 | Fujimura et al. |
| 2008/0309617 A1* | 12/2008 | Kong et al. .................. 345/157 |
| 2009/0059007 A1 | 3/2009 | Wagg |
| 2009/0141933 A1 | 6/2009 | Wagg |
| 2009/0186693 A1 | 7/2009 | Panoff |
| 2009/0221368 A1 | 9/2009 | Yen et al. |
| 2010/0002908 A1 | 1/2010 | Miyamoto et al. |
| 2010/0117837 A1* | 5/2010 | Stirling et al. ............ 340/573.1 |
| 2010/0197390 A1 | 8/2010 | Craig et al. |
| 2010/0197395 A1* | 8/2010 | Geiss ............................ 463/31 |
| 2010/0197399 A1 | 8/2010 | Geiss |
| 2011/0150271 A1 | 6/2011 | Lee et al. |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009059065 | 5/2009 |

OTHER PUBLICATIONS

Toyama, et al., "Probabilistic Tracking in a Metric Space," Eighth International Conference on Computer Vision, Vancouver, Canada, vol. 2, Jul. 2001, 8 pages.

Li, Y., et al., "Evaluating the Performance of Systems for Tracking Football Players and Ball," IEEE 2005, [http://ieeexplore.ieee.org/stamp/stamp.jsp?arnumber=01577342], pp. 632-637.

Fang, et al., "Full Body Tracking Using an Agent-based Architecture," IEEE Oct. 2008, [http://ieeexplore.ieee.org/stamp/stamp.jsp?tp=&arnumber=4906445&isnumber=4906435], 7 pages.

Gall, et al., "Motion Capture Using Joint Skeleton Tracking and Surface Estimation," [http://www.mpi-inf.mpg.de/~stoll/paper/stse.pdf], Jun. 2009, 8 pages.

Huang, Yu, et al., "Players and Ball Detection in Soccer Videos Based on Color Segmentation and Shape Analysis," Thomson Corporation Research, [http://www.ifp.illinois.edu/~yuhuang/papers/detection07/pdf], 2007, pp. 416-425.

Park, Sangho, et al., "Segmentation and Tracking of Interacting Human Body Parts under Occlusion and Shadowing," IEEE Workshop on Motion and Video Computing, Dec. 2002, pp. 105-111.

Singhal, Achal, et al., "Tracking soccer players using the graph representation," [http:www.ces.clemson.edu/~stb/ece847/projects/Tracking_soccer_players.pdf], Aug. 2004, 6 pages.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

(56) References Cited

OTHER PUBLICATIONS

Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real-World Disorders", Science Psychology.
Stevens, "Flights into Virtual Reality Treating Real World Disorders", The Washington Post, Mar. 27, 1995, Science Psychology, 2 pages.
Preliminary Amendment dated Mar. 6, 2012, U.S. Appl. No. 12/696,282.
Response to Office Action dated Aug. 3, 2012, U.S. Appl. No. 12/696,282.
Office Action dated Oct. 18, 2012, U.S. Appl. No. 12/696,282.
Chinese Office Action dated Jan. 31, 2013, Chinese Patent Application No. 201110037227.X.
Response to Office Action dated Jan. 31, 2013, U.S. Appl. No. 12/696,282.
Chinese Response to Office Action dated Apr. 17, 2013, Chinese Patent Application No. 201110037227.X.
Office Action dated May 10, 2012, U.S. Appl. No. 12/696,282.
Stevens, "Flights into Virtual Reality Treating Real-World Disorders", Science Psychology, The Washington Post, Mar. 27, 1995.
"Simulation and Training", 1994, Division Incorporated.
English Machine-translation of Japanese Publication No. JP08-044490 published on Feb. 16, 1996.
Final Office Action dated Feb. 11, 2014 in U.S. Appl. No. 12/696,282, 21 pages.
Chinese Second Office Action dated Jun. 18, 2013, Chinese Patent Application No. 201110037227.X.
Chinese Response to Office Action dated Jul. 15, 2013, Chinese Patent Application No. 201110037227.X.
Office Action dated Jul. 18, 2013, U.S. Appl. No. 12/696,282.
Response to Office Action filed May 12, 2014 in U.S. Appl. No. 12/696,282, 13 pages.
Notice of Allowance dated Jun. 12, 2014 in U.S. Appl. No. 12/696,282, 39 pages.
G. Pan, S. Han, Z. Wu, and Y. Wang, 3D Face Recognition Using Mapped Depth Images, IEEE Computer Society Conference on Computer Vision and Pattern Recognition. 2005. 7 pages.

\* cited by examiner

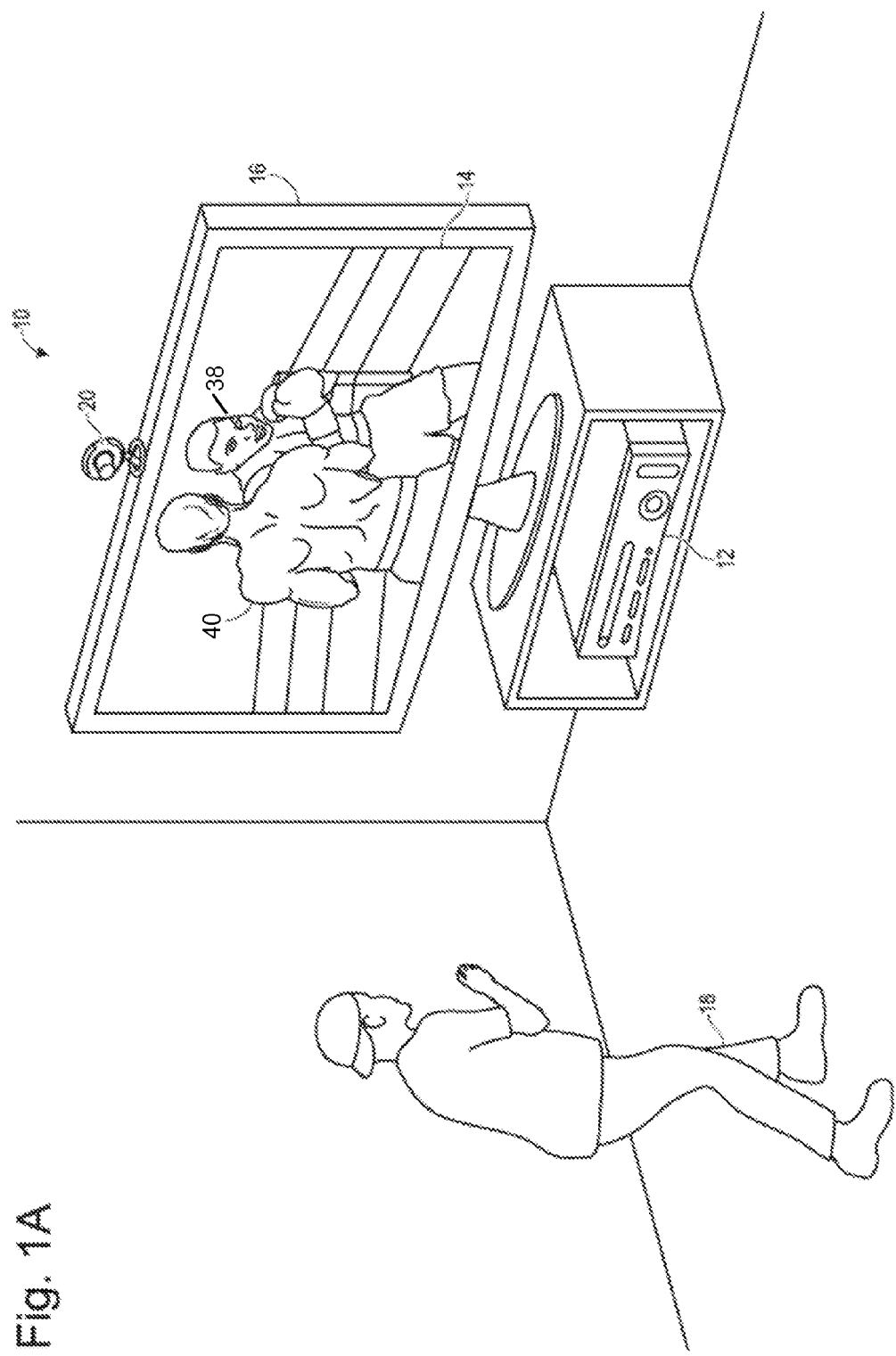

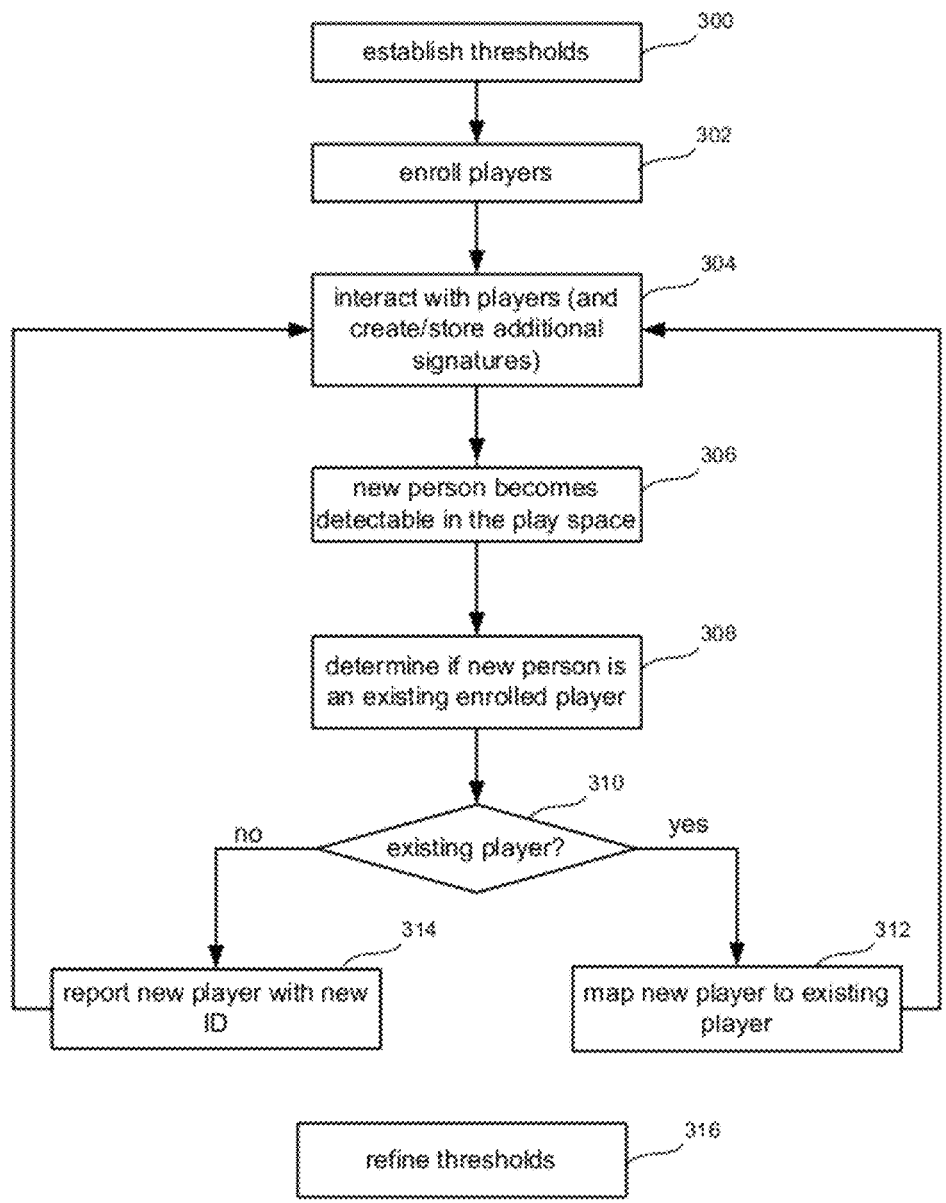

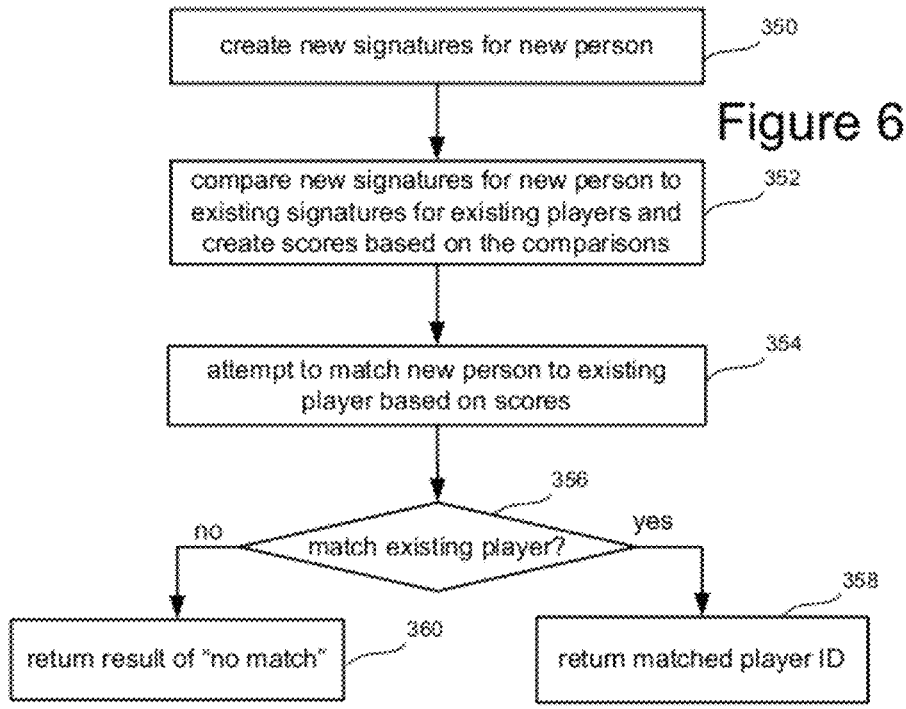
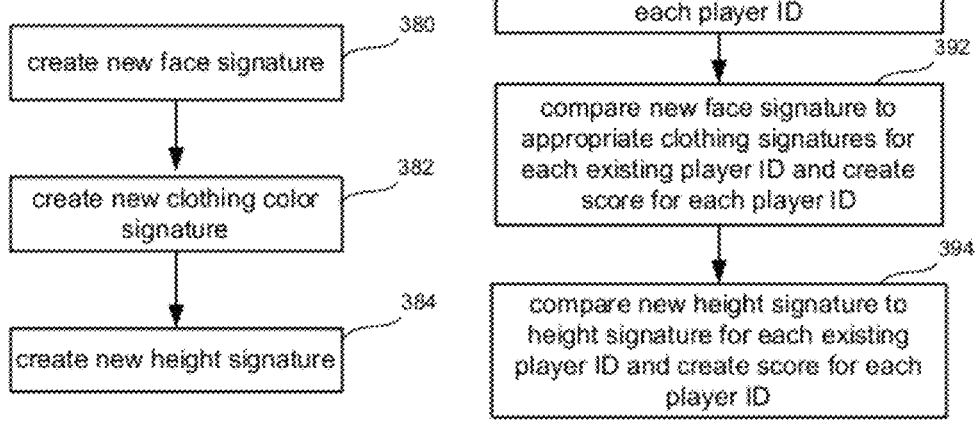

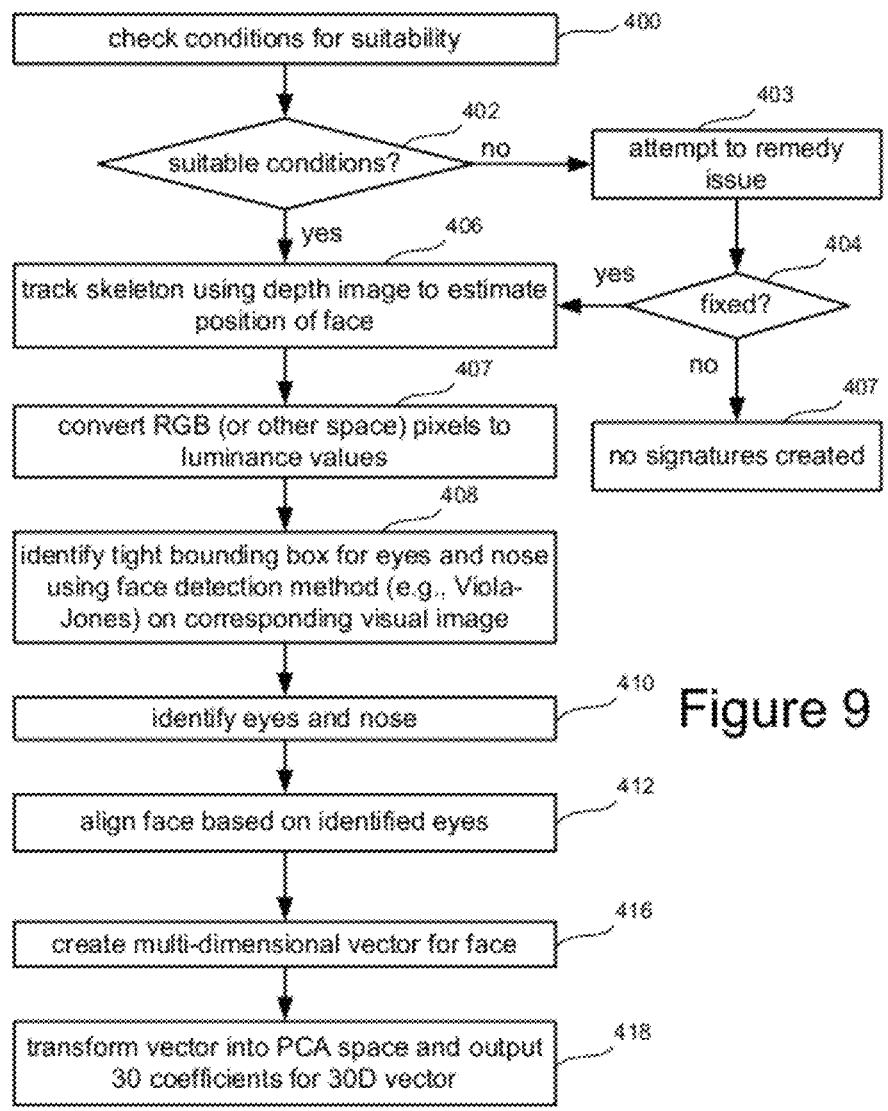
Figure 9
Figure 15
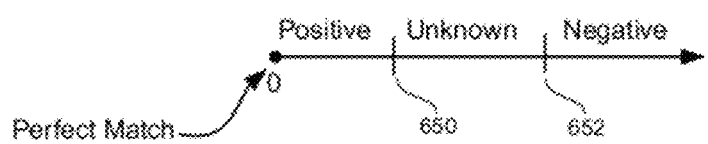

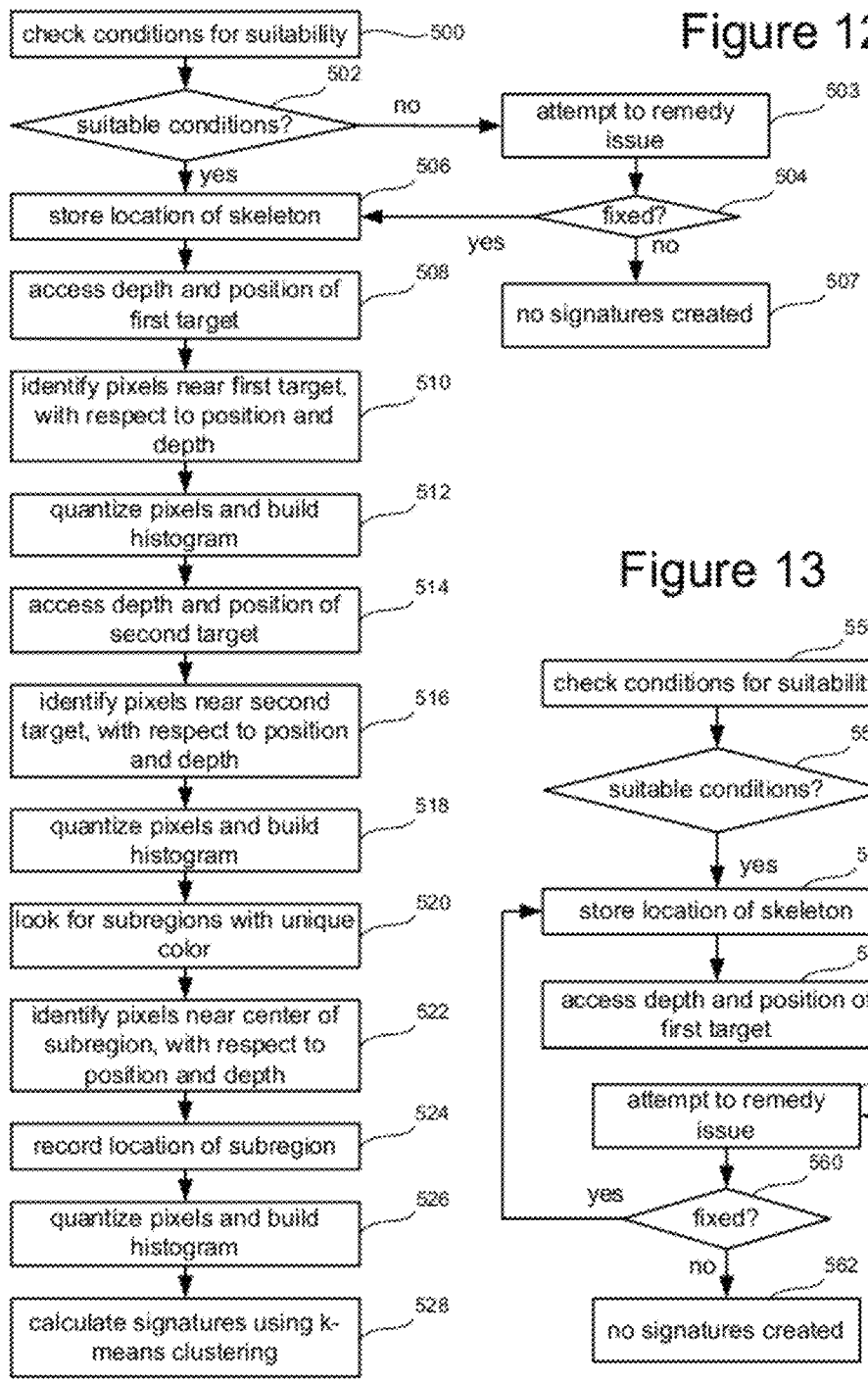

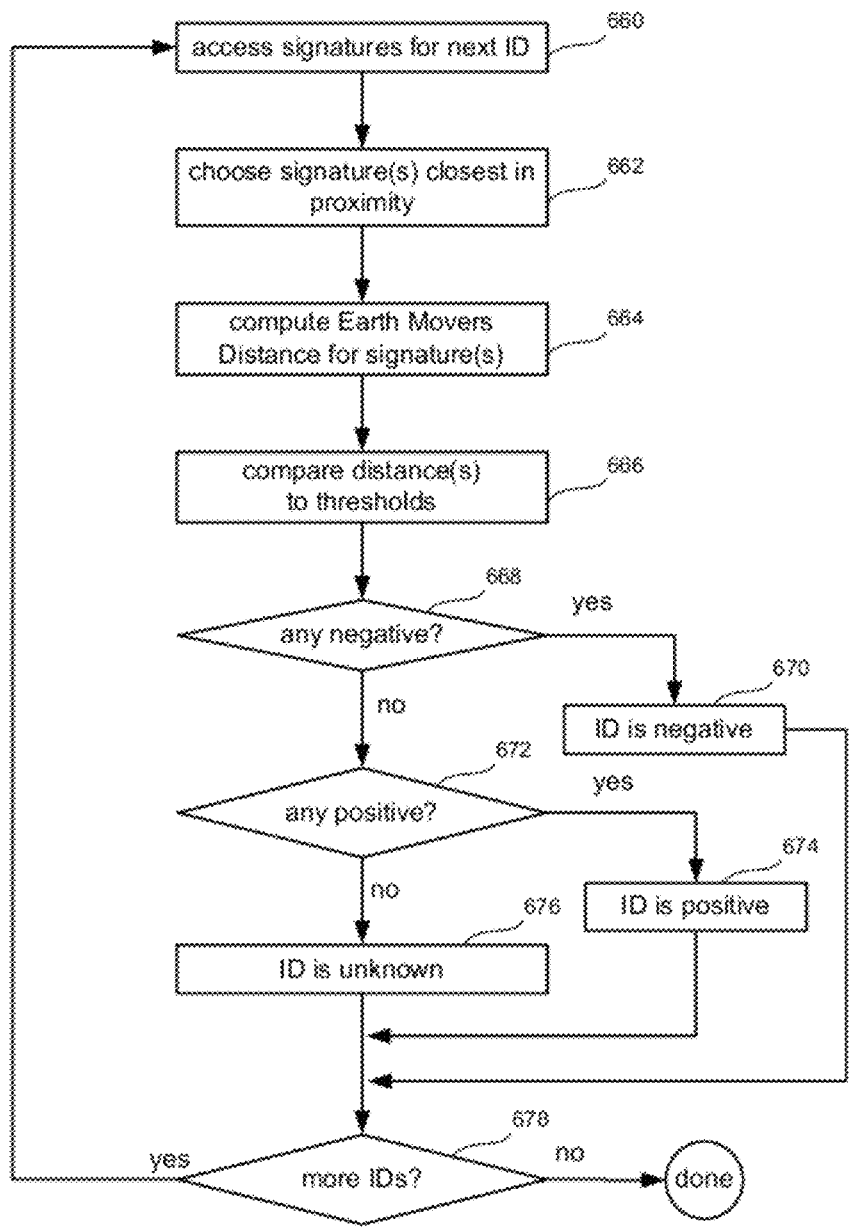

VISUAL BASED IDENTITY TRACKING

CLAIM OF PRIORITY

This application is a continuation application of U.S. application Ser. No. 12/696,282, "VISUAL BASED IDENTITY TRACKING," filed on Jan. 29, 2010, which is incorporated herein by reference in its entirety.

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games or applications. Furthermore, such controls may be different than actual game actions or other application actions for which the controls are used, thus, reducing the experience for the user. For example, a game controller that causes a game character to swing a baseball bat may not correspond to an actual motion of swinging the baseball bat.

One solution is to use a video game system that tracks motion of a user or other objects in a scene using visual and/or depth images. The tracked motion is then used to update an application. Therefore, a user can manipulate game characters or other aspects of the application by using movement of the user's body and/or objects around the user, rather than (or in addition to) using controllers, remotes, keyboards, mice, or the like. One challenge with such a system is to keep track of who is playing the game (or otherwise interacting with the application) as users move in, out and back into the field of view of the system.

SUMMARY

A system (e.g., video game system or other type of data processing system) is disclosed that can identify and track players as they enter the field of view of the system. For example, when a person enters the field of view of a video game system (e.g., enters a room or otherwise is no longer occluded), the system determines whether that person is one of the players who had been interacting with the game. If so, then the system maps that person to the identified player who had been interacting with the game so that the person can continue to interact with the game (e.g., control an avatar or object).

One embodiment includes performing a computer based application including interacting with a subset of a set of enrolled players, determining that a person (who is not one of the subset of the set of enrolled players currently interacting with the computer based application) has become detectable in the play space, automatically identifying the person as a specific enrolled player of the set of enrolled players, mapping the person to the specific enrolled player, and interacting with the person based on the mapping.

One embodiment includes an interface to a monitor, a sensor system, and one or more processors in communication with the interface and the sensor system. The one or more processors establish thresholds, enroll players in a video game, perform the video game including interacting with a subset of the players based on the enrolling, determine that a person has become detectable in the play space of the video game, automatically determine whether the person is one of the enrolled players, map the person to an enrolled player and interact with the person in the video game based on the mapping if it is determined that the person is one of the enrolled players, and assign a new identification to the person and interact with the person in the video game based on the new identification if it is determined that the person is not one of the enrolled players.

One embodiment includes receiving visual data and depth data from one or more sensors pertaining to a first entity not currently interacting with an application, creating a set of visual signatures indicative of appearance of the first entity based on the visual data and depth data, comparing the set of visual signatures to stored signatures for entities enrolled in the application, determining whether the visual signatures correspond to stored signatures for any of the entities enrolled in the application, and mapping the first entity to a particular entity enrolled in the application if it is determined that the visual signatures correspond to stored signatures for the particular entity. The mapping allows the first entity to interact with the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A and 1B illustrate an example embodiment of a tracking system with a user playing a game.

FIG. 5 is a flow chart describing one embodiment of a process for operating a data processing system (e.g., video game system) that can perform the visually based identity tracking as described herein.

FIG. 6 is a flow chart describing one embodiment of a process for determining if a player entering the field of view is an enrolled player.

FIG. 7 is a flow chart describing one embodiment of a process for creating new visual based signatures.

FIG. 8 is a flow chart describing one embodiment of a process for comparing visual based signatures.

FIG. 9 is a flow chart describing one embodiment of a process for creating a signature for a face.

FIG. 12 is a flow chart describing one embodiment of a process for creating signatures for clothing.

FIG. 13 is a flow chart describing one embodiment of a process for creating a signature for height.

FIG. 15 depicts the thresholds for classifying the result of a comparison.

FIG. 16 is a flow chart describing one embodiment of a process for comparing signatures for clothing.

FIG. 20 is a flow chart describing one embodiment of a process for creating and/or refining thresholds used when comparing signatures.

DETAILED DESCRIPTION

A video game system (or other data processing system) is disclosed that can visually identify whether a person who has entered a field of view of the system (e.g., entered a room or otherwise is no longer occluded) is a player who has been previously interacting with the system. In one embodiment, the system creates a set of visual signatures indicative of appearance of the person who entered the field of view and determines whether the visual signatures correspond to stored signatures for any of the entities enrolled with the system. If the person's visual signatures match an entity already enrolled, then the person will be mapped to that entity and will interact with the system based on the mapped entity. For example, if a person controlling avatar A in a video game leaves the room and subsequently returns to the room, upon return the system will recognize that the person is the previous player operating avatar A and will resume allowing the person to control Avatar A.

In one embodiment, the video game system (or other data processing system) tracks players and objects using depth images and/or visual images. The tracking is then used to update an application (e.g., a video game). Therefore, a user can manipulate game characters or other aspects of the application by using movement of the user's body and/or objects around the user, rather than (or in addition to) using controllers, remotes, keyboards, mice, or the like. For example, a video game system will update the position of images displayed in the video based on the new positions of the objects or update an avatar based on motion of the user. If a user walks out of the room (or is otherwise occluded during the game/application) and then walks back into the room (or is no longer occluded), then the system will automatically identify the user as the entity previously playing the game (or interacting with the application) and resume the interaction as per the previous mapping.

Although the examples below include a video game system, the technology described herein also applies to other types of data processing systems and/or other types of applications.

Figure 1B:
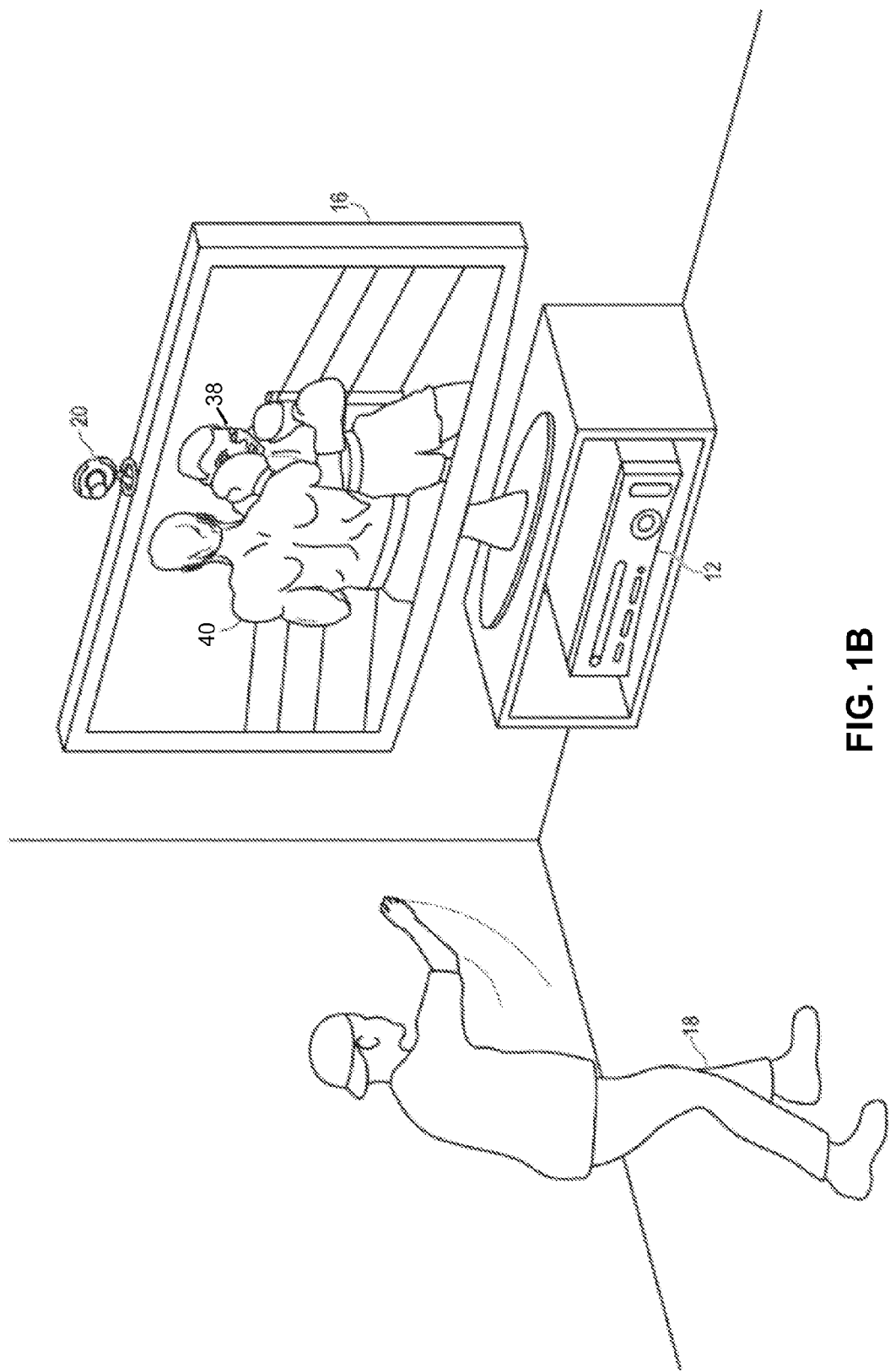

FIGS. 1A and 1B illustrate an example embodiment of a system 10 with a user 18 playing a boxing game. In an example embodiment, the system 10 may be used to recognize, analyze, and/or track a human target such as the user 18 or other objects within range of tracking system 10.

As shown in FIG. 1A, tracking system 10 may include a computing system 12. The computing system 12 may be a computer, a gaming system or console, or the like. According to an example embodiment, the computing system 12 may include hardware components and/or software components such that computing system 12 may be used to execute applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein.

As shown in FIG. 1A, tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within the application and/or animate an avatar or on-screen character, as will be described in more detail below.

According to one embodiment, the tracking system 10 may be connected to an audiovisual device 16 such as a television, a monitor, a high-definition television (HDTV), or the like that may provide game or application visuals and/or audio to a user such as the user 18. For example, the computing system 12 may include a video adapter such as a graphics card and/or an audio adapter such as a sound card that may provide audiovisual signals associated with the game application, non-game application, or the like. The audiovisual device 16 may receive the audiovisual signals from the computing system 12 and may then output the game or application visuals and/or audio associated with the audiovisual signals to the user 18. According to one embodiment, the audiovisual device 16 may be connected to the computing system 12 via, for example, an S-Video cable, a coaxial cable, an HDMI cable, a DVI cable, a VGA cable, component video cable, or the like.

As shown in FIGS. 1A and 1B, the tracking system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer environment 12. Thus, according to one embodiment, the user 18 may move his or her body to control the application and/or animate the avatar or on-screen character.

In the example depicted in FIGS. 1A and 1B, the application executing on the computing system 12 may be a boxing game that the user 18 is playing. For example, the computing system 12 may use the audiovisual device 16 to provide a visual representation of a boxing opponent 38 to the user 18. The computing system 12 may also use the audiovisual device 16 to provide a visual representation of a player avatar 40 that the user 18 may control with his or her movements. For example, as shown in FIG. 1B, the user 18 may throw a punch in physical space to cause the player avatar 40 to throw a punch in game space. Thus, according to an example embodiment, the computer system 12 and the capture device 20 recognize and analyze the punch of the user 18 in physical space such that the punch may be interpreted as a game control of the player avatar 40 in game space and/or the motion of the punch may be used to animate the player avatar 40 in game space.

Other movements by the user 18 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 40. For example, in one embodiment, the player may use movements to end, pause, or save a game, select a level, view high scores, communicate with a friend, etc. According to another embodiment, the player may use movements to select the game or other application from a main user interface. Thus, in example embodiments, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game. Objects not held by the user can also be tracked, such as objects thrown, pushed or rolled by the user (or a different user) as well as self propelled objects. In addition to boxing, other games can also be implemented.

According to other example embodiments, the tracking system 10 may further be used to interpret target movements as operating system and/or application controls that are outside the realm of games. For example, virtually any controllable aspect of an operating system and/or application may be controlled by movements of the target such as the user 18.

Figure 2:
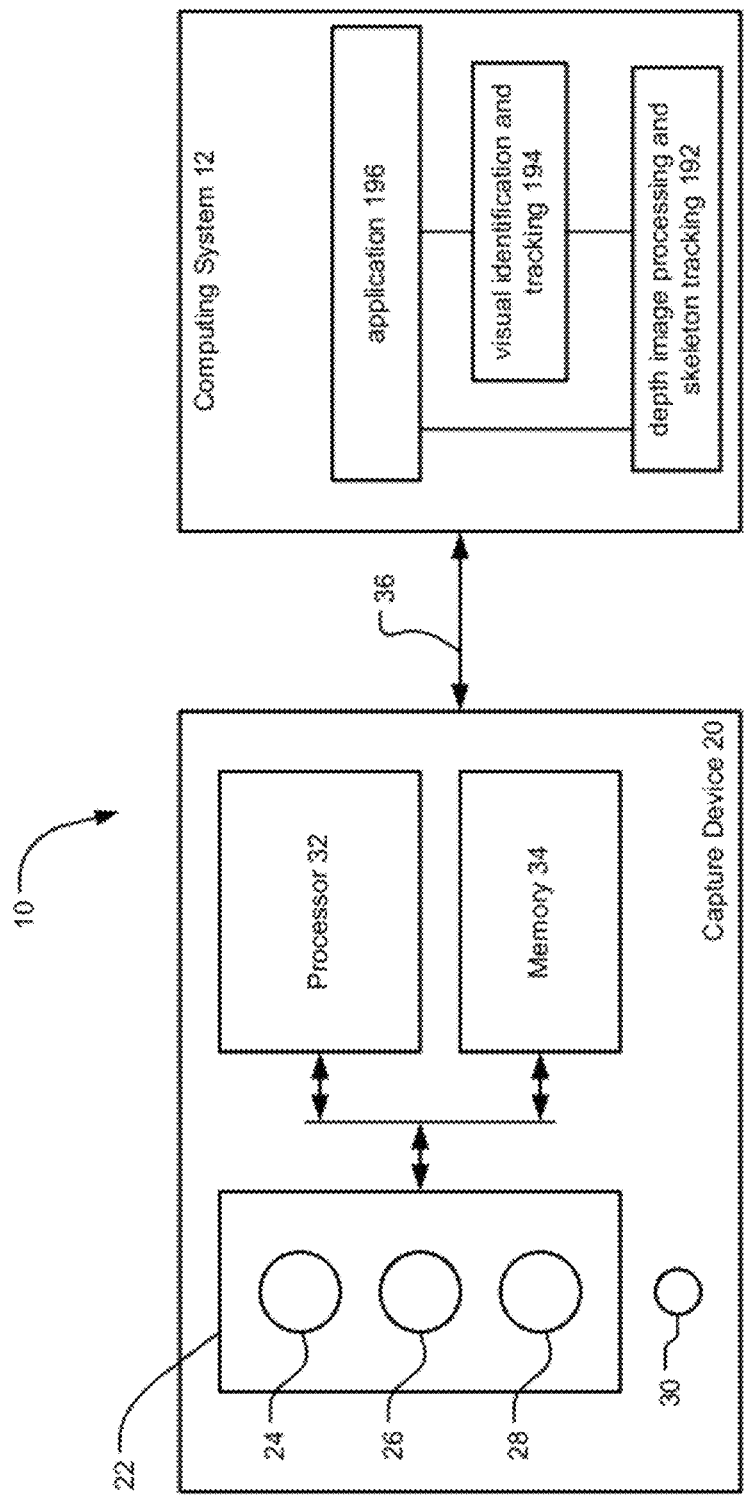
FIG. 2 illustrates an example embodiment of a capture device that may be used as part of the tracking system.

FIG. 2 illustrates an example embodiment of the capture device 20 that may be used in the tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, according to an example embodiment, the image camera component 22 may include an infra-red (IR) light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern, a stripe pattern, or different pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 (and/or other sensor) and may then be analyzed to determine a physical distance from the capture device to a particular location on the targets or objects. In some implementations, the IR Light component 24 is displaced from the cameras 24 and 26 so triangulation can be used to determined distance from cameras 24 and 26. In some implementations, the capture device 20 will include a dedicated IR sensor to sense the IR light, or a sensor with an IR filter.

According to another embodiment, the capture device 20 may include two or more physically separated cameras that may view a scene from different angles to obtain visual stereo data that may be resolved to generate depth information. Other types of depth image sensors can also be used to create a depth image.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing system 12 in the target recognition, analysis, and tracking system 10. Additionally, the microphone 30 may be used to receive audio signals that may also be provided by the user to control applications such as game applications, non-game applications, or the like that may be executed by the computing system 12.

In an example embodiment, the capture device 20 may further include a processor 32 that may be in communication with the image camera component 22. The processor 32 may include a standardized processor, a specialized processor, a microprocessor, or the like that may execute instructions including, for example, instructions for receiving a depth image, generating the appropriate data format (e.g., frame) and transmitting the data to computing system 12.

The capture device 20 may further include a memory component 34 that may store the instructions that are executed by processor 32, images or frames of images captured by the 3-D camera and/or RGB camera, or any other suitable information, images, or the like. According to an example embodiment, the memory component 34 may include random access memory (RAM), read only memory (ROM), cache, flash memory, a hard disk, or any other suitable storage component. As shown in FIG. 2, in one embodiment, memory component 34 may be a separate component in communication with the image capture component 22 and the processor 32. According to another embodiment, the memory component 34 may be integrated into processor 32 and/or the image capture component 22.

As shown in FIG. 2, capture device 20 may be in communication with the computing system 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing system 12 may provide a clock to the capture device 20 that may be used to determine when to capture, for example, a scene via the communication link 36. Additionally, the capture device 20 provides the depth information and visual (e.g., RGB) images captured by, for example, the 3-D camera 26 and/or the RGB camera 28 to the computing system 12 via the communication link 36. In one embodiment, the depth images and visual images are transmitted at 30 frames per second. The computing system 12 may then use the model, depth information, and captured images to, for example, control an application such as a game or word processor and/or animate an avatar or on-screen character.

Computing system 12 includes depth image processing and skeleton tracking 192, visual identification and tracking 194 and application 196. Depth image processing and skeleton tracking 192 uses the depth images to track motion of objects, such as the user and other objects. To assist in the tracking of the objects, depth image processing and skeleton tracking 192 uses a gestures library and structure data to track skeletons. The structure data includes structural information about objects that may be tracked. For example, a skeletal model of a human may be stored to help understand movements of the user and recognize body parts. Structural information about inanimate objects may also be stored to help recognize those objects and help understand movement. The gestures library may include a collection of gesture filters, each comprising information concerning a gesture that may be performed by the skeletal model (as the user moves). The data captured by the cameras 26, 28 and the capture device 20 in the form of the skeletal model and movements associated with it may be compared to the gesture filters in the gesture library to identify when a user (as represented by the skeletal model) has performed one or more gestures. Those gestures may be associated with various controls of an application. Visual images from capture device 20 can also be used to assist in the tracking.

Visual identification and tracking module 194 is in communication with depth image processing and skeleton tracking 192, and application 196. Visual identification and tracking module 194 visually identifies whether a person who has entered a field of view of the system is a player who has been previously interacting with the system, as described below. Visual identification and tracking module 194 will report that information to application 196.

Application 196 can be a video game, productivity application, etc. In one embodiment, depth image processing and skeleton tracking 192 will report to application 196 an identification of each object detected and the location of the object for each frame. Application 196 will use that information to update the position or movement of an avatar or other images in the display.

Figure 3:
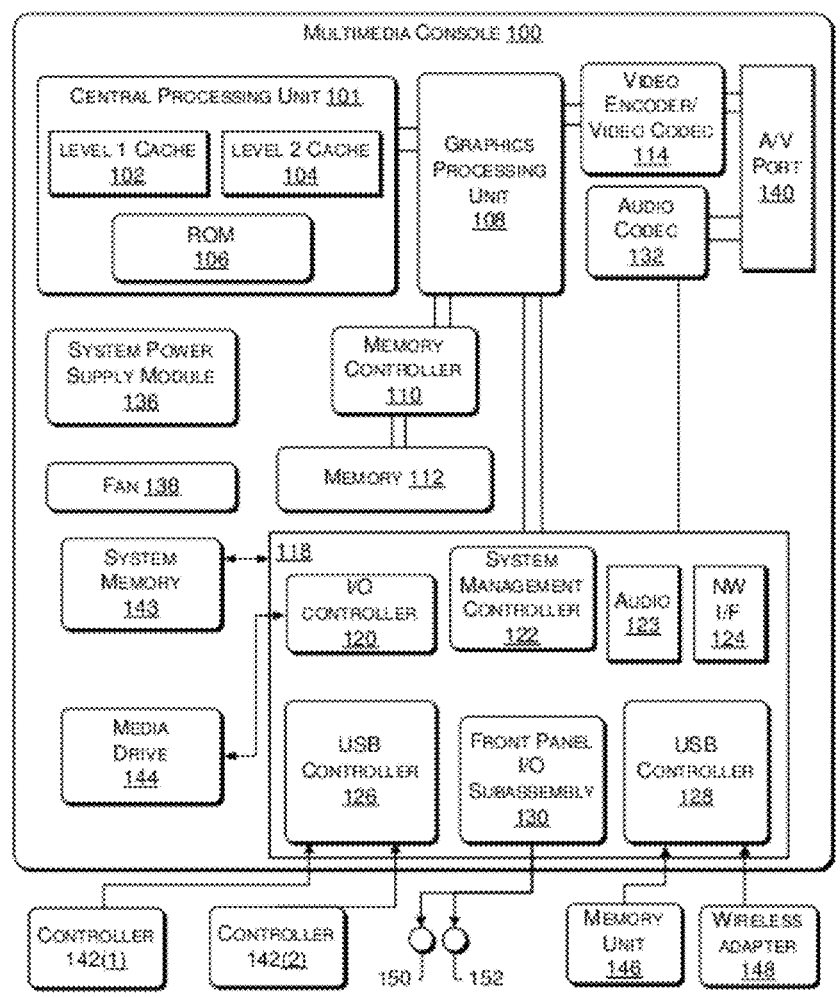
FIG. 3 illustrates an example embodiment of a computing system that may be used to track motion and update an application based on the tracked motion.

FIG. 3 illustrates an example embodiment of a computing system that may be the computing system 12 shown in FIGS. 1A-2 used to track motion and/or animate (or otherwise update) an avatar or other on-screen object displayed by an application. The computing system such as the computing system 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, Blu-Ray drive, hard disk drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100 via USB controller 126 or other interface.

Figure 4:
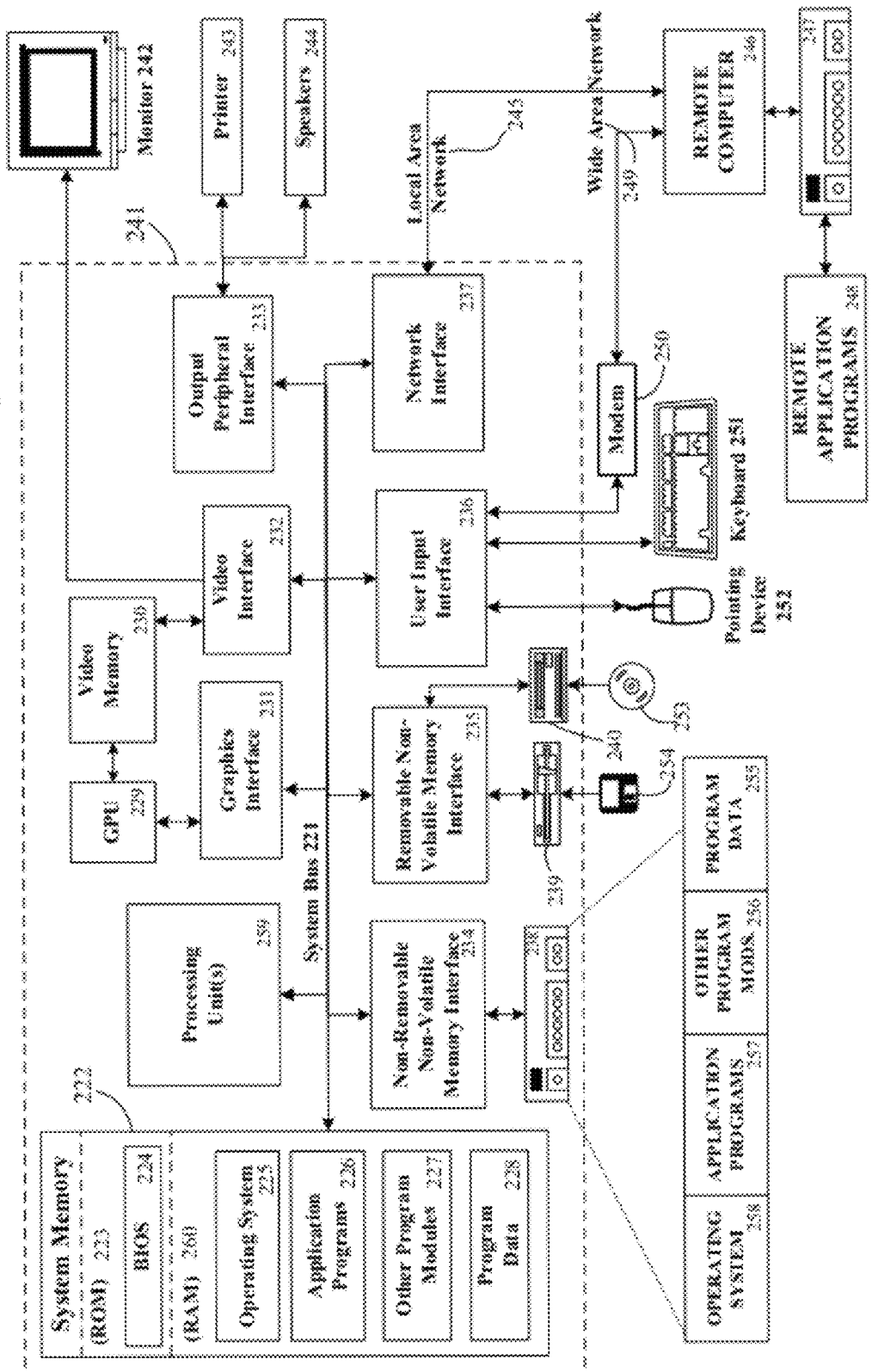
FIG. 4 illustrates another example embodiment of a computing system that may be used to track motion and update an application based on the tracked motion.

FIG. 4 illustrates another example embodiment of a computing system 220 that may be used to implement the computing system 12 shown in FIGS. 1A-2 used to track motion and/or animate (or otherwise update) an avatar or other on-screen object displayed by an application. The computing system environment 220 is only one example of a suitable computing system and is not intended to suggest any limitation as to the scope of use or functionality of the presently disclosed subject matter. Neither should the computing system 220 be interpreted as having any dependency or requirement relating to any one or combination of components illustrated in the exemplary operating system 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100 that connect via user input interface 236. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233. Capture Device 20 may connect to computing system 220 via output peripheral interface 233, network interface 237, or other interface.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates application programs 248 as residing on memory device 247. It will be appreciated that the network connections shown are exemplary and other means of establishing a communications link between the computers may be used.

As explained above, capture device 20 provides RGB images (or visual images in other formats or color spaces) and depth images to computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device.

The system will use the RGB images and depth images to track a player's movements. An example of tracking can be found in U.S. patent application Ser. No. 12/603,437, "Pose Tracking Pipeline," filed on Oct. 21, 2009, incorporated herein by reference in its entirety. Other methods for tracking can also be used. Once the system determines the motions the player is making, the system will use those detected motions to control a video game or other application. For example, a player's motions can be used to control an avatar and/or object in a video game.

While playing a video game or interacting with an application, a person (or user) may leave the field of view of the system. For example, the person may walk out of the room or become occluded. Subsequently, the person may reenter the field of view of the system. For example, the person may walk back into the room or is no longer occluded. When the person enters the field of view of the system, the system will automatically identify that the person was playing the game (or otherwise interacting with the application) and map that person to the player who had been interacting with the game. In this manner, the person can re-take control of that person's avatar or otherwise resume interacting with the game/application.

FIG. 5 is a flow chart describing one embodiment of operating the systems of FIGS. 1-4 so that a person entering the field of view of the system (e.g., the play space of a game) is identified and mapped to an existing player/user.

The process of FIG. 5 includes visually identifying and tracking players in order to determine whether a player who has become visible to the system matches an existing enrolled player. To make these determinations, a set of thresholds are used to perform the visual identification. More details of these thresholds are discussed below. In step 300 of FIG. 5, the thresholds for making the comparisons are established. These thresholds can be established by experimentation and simulation. The initial thresholds can be created prior to manufacturing and shipped with the initial version of the system. In another embodiment, the thresholds are created dynamically by the system during operation. More details for establishing thresholds will be discussed below.

In step 302, the system will enroll players. For example, when playing a video game, a system may ask the users how many players will be playing that game. After the users respond with the number of players, the system will ask each player to identify themselves. In one embodiment, each player will be asked to identify themselves by standing in front of the system so that depth images and visual images can be obtained from multiple angles for that player. For example, the player may be asked to stand in front of the camera, turn around, and make various poses. After the system obtains its data necessary to identify that person, that person will be provided with a unique identification and that unique identification can be assigned to an avatar or object in the game/application.

In step 304 of FIG. 5, the system will interact with the players. For example, one or more video games or other applications (e.g., application 196) can be played.

In one embodiment, the visual identification discussed herein is performed by creating and comparing visual signatures. More details about the visual signatures will be provided below. In one embodiment of step 304, the system dynamically creates an/or updates signatures and store those updated or created signatures.

In step 306 of FIG. 5, the system determines that a new person is now detectable in the play space. For example, within the field of view of sensor system 20, one or more players (who are not currently visible or detectable) becomes detectable. For example, a person may walk into the room where sensor 20 is located. Alternatively, a person may walk into a portion of the room where sensor load 20 can detect the person. Another example is that a person who was previously occluded from sensor 20 is no longer occluded from sensor 20.

In step 308, the system automatically determines whether that new person is an existing player who has already been enrolled in the currently active video game/application. If it is determined that the new person is an existing player who was already enrolled in the current application/game (step 310), then the new player is mapped to that existing player in step 312. If it is determined that the new person is not an existing player who was already enrolled in the game/application (step 310), then the system creates a new identification for the player, assigns that new identification to the player and reports to the application/game (application 196) that new player (with the new identification) to the application. After step 312 and after step 314 the process continues at step 304. In one embodiment, steps 308-312 are performed by visual identification and tracking module 194.

Note that FIG. 5 also shows step 316 of refining the thresholds. The reason step 316 is not connected to any particular other step is because step 316 could happen at any time. Based on data the system has, the system may decide to dynamically update any of the thresholds. More detail of the thresholds and updating will be provided below.

FIG. 6 is a flow chart describing one embodiment of a process for automatically determining if a new player is an existing player who is already enrolled in the video game/application. For example, the process of FIG. 6 is one example implementation of step 308 of FIG. 5. In step 350 of FIG. 6, the system creates new signatures for the new person who is detected to enter the play space. More details for how to create signatures and the of structure signatures is provided below. In step 352, the system compares the new signatures for the new person who entered the play space to existing signatures for existing players who are enrolled in the video game/application. Based on that comparison, the system will create scores. In step 354, the system will attempt to match the new person to one of the existing enrolled players based on the scores from step 352. If there is a match (step 356), then the process will return the identification of the matched player in step 358. If there is no match (step 356), then the process of FIG. 6 will return "no match." More details of steps 350-356 are provided below.

FIG. 7 is a flow chart describing one embodiment of a process for automatically creating new signatures for a new person entering the play space. For example, the process of FIG. 7 is one example implementation of step 350 of FIG. 6. In this embodiment, the system will use three sets of signatures to identify persons. A first set of one or more signatures pertain to the face of a person, the second set of one or more signatures pertain to the clothing the person is wearing, and the third set of one or more signatures pertain to the height of the person. In one embodiment, each of the three sets of signatures is based on the depth image and the visual image. In other embodiments, the signature can be based only on visual images. In other embodiments, some of the signatures will be based on a combination of depth images and visual images, while other signatures will be based solely on visual images. In yet another embodiment, all these signatures (or a subset of signatures) can be based exclusively on depth images. In another embodiment, infrared images can be used to create one or more signatures.

In step 380 of FIG. 7, the system creates a new face signature for the person who was just detected to enter the play space (see step 306 of FIG. 5). In step 382, the system creates one or more color signatures for the clothing that the person is wearing. In step 384, the system creates a signature for the person's height. More details of each of steps 380-384 are provided below.

FIG. 8 is a flow chart describing one embodiment of the process of comparing the three sets of signatures. For example, the process of FIG. 8 is one example of implementation of step 352 of FIG. 6. In step 390 of FIG. 8, the face signature created in step 380 is compared to face signatures for each of the existing players enrolled in the current application/video game. Each comparison will result in a score that reflects how close the signatures match each other. In step 392, one or more signatures for the clothing of the person who is detected to enter the play space is compared to the various clothing signatures for the existing players enrolled in the current application/video game. In one embodiment, a single score is created which reflects comparison of all of the newly created clothing signatures for the new person entering the play space to each of the signatures for each enrolled player. In step 394, the height signature for the person detected to have entered the play space is compared against the height signatures for each of the players enrolled in the current application/video game. A score for each enrolled player is created based on the comparison. In one embodiment, at the end of the process depicted in FIG. 8, each player that is enrolled in the current application/video game will have three scores: a score for a comparison of face signatures, a score for a comparison of clothing signatures and a score for a comparison of height signatures. In one embodiment, the processes of FIGS. 6, 7 and 8 are performed automatically by computing system 12.

FIG. 9 is a flow chart describing one embodiment of a process for creating a face signature. That is, FIG. 9 is one example implementation of performing step 380 of FIG. 7. In step 400, the system determines whether the conditions for obtaining a face signature are suitable. For example, the system determines whether the person is facing the camera so that the face can be seen. Additionally, the system may check for appropriate lighting conditions or an occlusion of the face.

If the conditions are not suitable (step 402), then after enough frames with a recurring unsuitable condition the system will notify the application (e.g., video game) that the conditions are unsuitable (e.g., "face is occluded", "not facing the camera" etc.). As explained in more detail below, the system will try to remedy the issue in step 403. For example, the game can entice the player to correct these conditions either explicitly by a notification of some sort (e.g., text notification or a game character instructing the player on how to correct the condition, e.g., "please look at the screen") or explicitly by soliciting an action by the player that will effectively improve the conditions ("throwing a ball" to the edge of the screen such that the player will attempt to hit that ball and thus not occlude his face). If the issue can be fixed, the process resumes at step 406 (discussed below). If the problem cannot be fixed, then no signature is created at this time.

Figure 10:
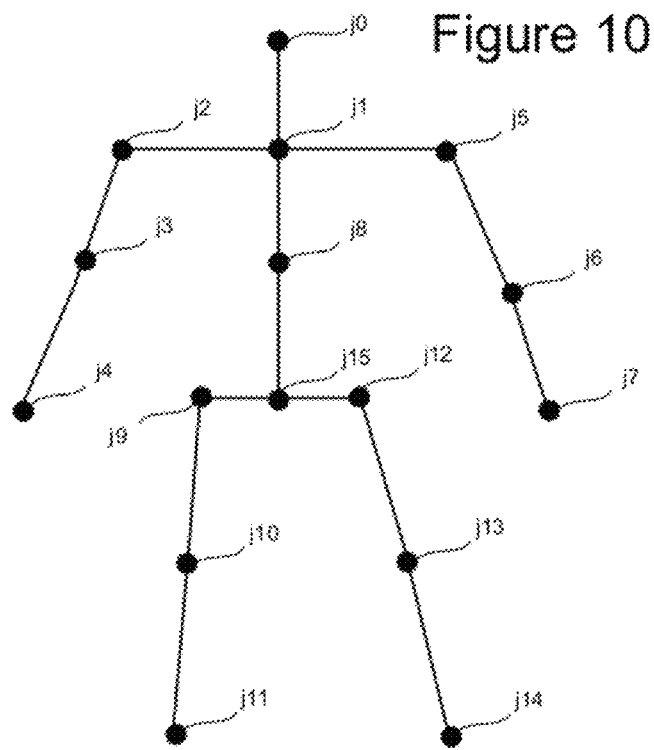
FIG. 10 depicts an example of a skeleton.
Figure 11:
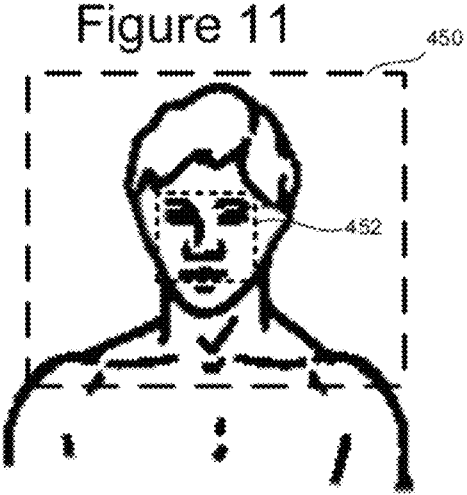
FIG. 11 shows a face with two bounding boxes.

If the conditions are suitable (step 402), then the system will track the skeleton of the person using the depth image to estimate the position of the face. There are many methods that can be used to track the skeleton of a person using depth images. In one embodiment of tracking a skeleton using depth image is provided in U.S. patent application Ser. No. 12/603,437, "Pose Tracking Pipeline" filed on Oct. 21, 2009, Craig, et al. (hereinafter referred to as the '437 Application), incorporated herein by reference in its entirety. The process of the '437 Application includes acquiring a depth image, down sampling the data, removing and/or smoothing high variance noisy data, identifying and removing the background, and assigning each of the foreground pixels to different parts of the body. Based on those steps, the system will fit a model with the data and create a skeleton. The skeleton will include a set of joints and connections between the joints. FIG. 10 shows an example skeleton with 15 joints (j0, j1, j2, j3, j4, j5, j6, j7, j8, j9, j10, j11, j12, j13, j14 and j15). Each of the joints represents a place in the skeleton where the skeleton can pivot in the x, y, z directions or a place of interest on the body. Step 406 includes using the skeleton to estimate a position of the face. For example, joint j0 may correspond to the center of the head. Based on knowing where j0 is, the system can estimate where the face should be. This estimation will be conservative such that a bounding box will be determined that is big enough to guarantee that the face is inside the box. For example, FIG. 11 shows the top of a human torso with bounding box 450 surrounding the face. This bounding box 450 is an example of the estimation of the position of the face from step 406.

In step 407, the RGB pixels (or other color space pixels) are converted into luminance values in the visual image for the portion of visual image that corresponds to the face. In one embodiment, the luminance values are gray scale values between 0 and 255 (or another range of numbers). In step 408, the system will refine the estimation in the face by identifying the eyes and nose and creating a box that more tightly bounds the eyes and nose with the face. FIG. 11 shows box 452 as the result of step 408, which is a box that more tightly bounds the eyes and nose. There are many face detection methods that can be performed to accomplish the process of step 408. One example process that can be used is Viola-Jones method, which is well known in the art.

As mentioned above, sensor 20 will detect visual images and depth images. The visual image will be correlated to the depth image such that each pixel in the depth image will correspond to a pixel in the visual image. Therefore, when a face is determined in the depth image, the system will know the location of the face in the visual image. In step 410, the system can use the visual image (or the depth image) to identify the exact location of the eyes and nose. In step 412, the system will align the user's face based on the eyes identified in step 410. In order to match signatures, it is important that the face is in the correct alignment so the signatures are analogous. Therefore, the system will determine a reference alignment in advance. When a face is detected that is not in that reference alignment, step 412 will realign the face in the image to match the alignment of the reference alignment. In some embodiments, the system could have multiple reference alignments and create multiple face signatures in the different reference alignments. In one embodiment, only one alignment is used to create signatures and perform comparisons.

In step 416, the system will create a multi-dimensional vector for the face. Each dimension in the vector corresponds to a pixel in the face. So if box 452 includes 400 pixels, then the vector has 400 elements. In one embodiment, the box is align in step 412 such that the box has 48×42 pixels (2016 pixels in total) so that and the multi-dimensional vector in step 416 includes 2016 values. In some embodiments, the data for the face can be down-sampled. In step 418, the multi-dimensional vector is transformed into PCA space to an vector with 30 coefficients (e.g., a 30 dimensional vector). PCA (Principal Component Analysis) is a well known process in the art. However, other processes for transforming the vector can also be used. Additionally, in some embodiments, step 418 can be skipped. The 30 dimensional vector that is the result of step 418 is the signature for the face. However, other formats for the signature can also be used.

FIG. 12 is a flow chart describing one embodiment of a process for creating one or more clothing signatures. The process of FIG. 12 is one example implementation of step 382. In step 500, the system checks to make sure that the conditions are suitable for creating clothing signatures. For example, the system may determine whether the lighting is sufficient, whether the person's clothing is unoccluded, and whether the person is in a proper pose for determining a signature based on clothing. If the conditions are not suitable for creating one or more signatures (step 502), then the system attempts to fix the issue (as mentioned above and described in more detail below) in step 503. If the issue can be fixed (step 504), then the signature generation process resumes at step 506. If the issued cannot be fixed (step 504), then no signature is created at this time. (step 507).

If the conditions are suitable for creating signatures (step 502), then at step 506 the system will store the current location of the skeleton being sensed by sensor 20. For example, the system may store the three dimensional coordinates of where the skeleton is. Alternatively, the system can classify the skeleton as being in one of a set of zones that are within the field of view of the sensor 20.

In one embodiment, the clothing signatures are based on color and the system will create multiple clothing signatures for different parts of the tracked person's body. Each of the different parts of the tracked person's body corresponding to a signature is referred to below as a target. In one embodiment, the system will create signatures for two targets. One example of a target is the player's pants, centered around j9, j10, j12, j13 and/or j15. Another example of a target is the player's shirt, centered around j8. These two targets may be represented by joints j8 and j9 of the skeleton (see FIG. 10). In other embodiments, there can be more than two targets or less than two targets.

In step 508 of FIG. 12, the system will access the depth value and position of the first target. Step 508 includes the system determining the depth value and x, y position of the first target (e.g., pants or joints j9, j10, j12, j13 and/or j15). In step 510, the system will identify pixels near the first target. In an embodiment that uses the skeleton discussed above, the system will identify one or more of the joints as the first target and step 510 will choose pixels near the first target with respect to position and depth. In one example, the system will use a range such that the system will pick pixels within an x, y position range in the visual image and then choose a subset of those pixels that are within a range of depth values from the joint chosen in step 508. In step 512, the set of pixels is quantized. In some systems, there can be millions of color combinations. Step 512 includes reducing the resolution such that all colors are classified into a small set of 256 colors so that each pixel, rather than having three color values, has one color value from 0 to 255. In one embodiment, RGB values can also be converted to HSV values prior to or during quantizing. Step 512 also includes building histograms for the set of pixels. In one example, a histogram would include 256 values along the x axis each pertaining to one of the 256 colors and the y axis identifies the number of pixels for each color value. Step 512 does not actually require the building of a visible graph, but rather a data structure representing the histogram.

In step 514, the system will access a depth value and position (x, y on the screen) of the second target (e.g., shirt). In step 516, the system will identify pixels that are near the second target in the visual image and within a threshold amount of depth from the position chosen in step 514. In step 518, the set of pixels is quantized and a histogram is built. In embodiments that use more than two targets, steps 514, 516 and 518 can be repeated for the additional targets.

In step 520, the system will look for one or more sub-regions along the skeleton that has unique color. For example, the system will use the skeleton to identify pixels in the visual image that belong to the person. The system will then look for one or more sub-regions of the pixels that have a unique color with respect to the remainder of the image. One example of a sub-region is a logo on a t-shirt. If the systems finds a sub-region of pixels that have a unique color, then in step 522 pixels that are proximate to the center of the sub-region and that have a similar depth value as the center of the sub-region are identified. The location of that sub-region in three dimensional space and on the skeleton are recorded and stored at step 524. In step 526, the set of pixels is quantized and a histogram is built. In some embodiments, steps 520-526 are skipped if the system cannot find such special regions of the clothing.

At this point, the system has up to three histograms: a first histogram pertaining to the first target, a second histogram pertaining to the second target, and a third histogram pertaining to the sub-region identified in step 520. In step of 528, the system calculates one or more signatures from the histograms using K-means clustering. The K means clustering returns a cluster center, how many pixels are in the cluster and how far to the center of the cluster the edge of the cluster is.

In one embodiment, the system generates separate signatures for the first target, the second target and the subregion with unique color. In such an embodiment, the K_means clustering is performed separately for each histogram. The result of the K-means clustering for each histogram includes 15 values for each histogram, representing a signature.

In another embodiment, the system generates one combine signature for first target, the second target and the subregion with unique color. In such an embodiment, the result of the K-means clustering for each histogram includes 15 values for the three histograms, representing one signature. In another embodiment, the system generates one combine signature for first target and the second target and creates a second signature for the subregion with unique color.

FIG. 13 is a flow chart describing one embodiment of a process for creating height signatures. The process of FIG. 13 is one example implementation of step 384 of FIG. 7. In step 550 of FIG. 13, the system determines whether the conditions are suitable for creating a height signature. For example, if the user's head is not visible, then the conditions are not suitable for determining a height signature. If the conditions are not suitable for creating a height signature (step 552), then the system attempts to fix the issue (as mentioned above and described in more detail below) in step 558. If the issue can be fixed, then the signature generation process resumes at step 554. If the issued cannot be fixed, then no signature is created at this time (step 562).

If the conditions are suitable (step 552), then the location of the skeleton is stored in step 554. In one embodiment, step 554 includes storing the three-dimensional location of the player at the time that the height signature is being created. This will be used to interpolate when comparing signatures, as described below.

In step 556 of FIG. 13, the system will access the depth and position of the first target. In one embodiment, the system will determine the three-dimensional position of the user's head. One means for determining the three-dimensional position of the user's head is to use joint j0 of the skeleton of FIG. 10. That skeleton will include the three-dimensional location of the joint. The system could have a mathematical formula for converting the three-dimensional position of joint j0 to the top of a human head. As long as this estimation is consistent, it will work for these purposes. In another embodiment, the system can visually identify the top of the head, visually identify the bottom of the feet (or the floor) and use depth to calculate height. Other embodiments for determining height are also suitable. The result of the above embodiment of FIG. 13 includes two values: a height value and a position of the skeleton in the field of view of sensor 20.

Figure 14:
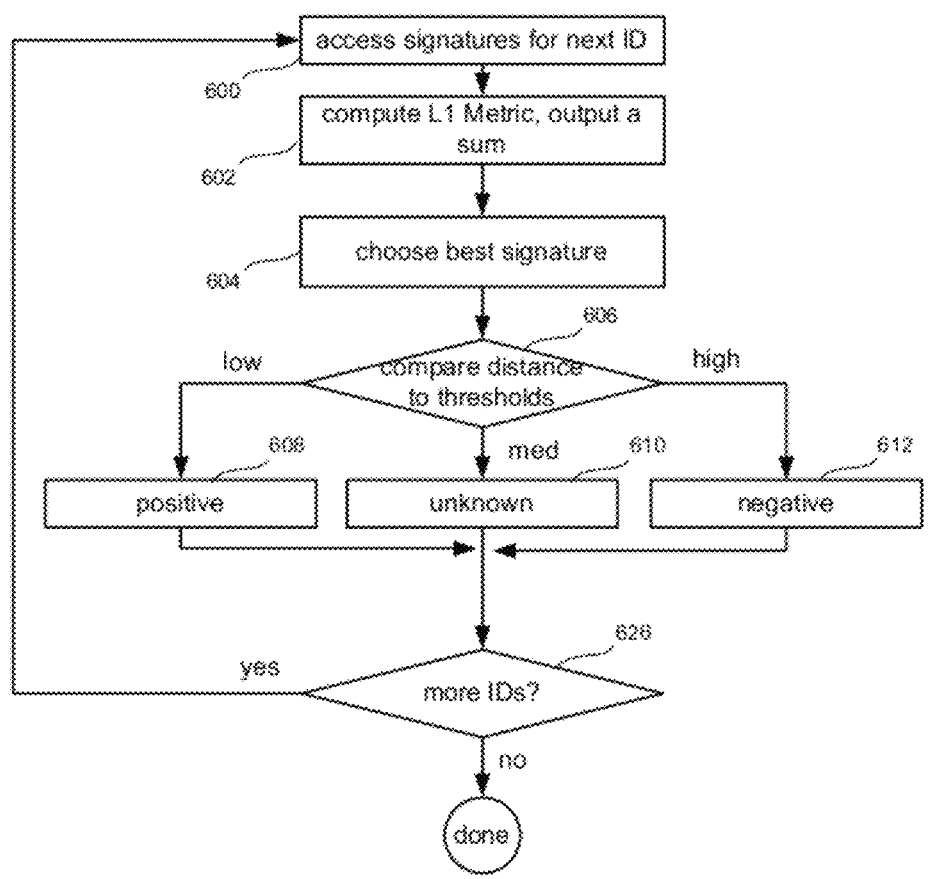
FIG. 14 is a flow chart describing one embodiment of a process for comparing signatures for a face.

FIG. 14 is a flow chart describing one embodiment of a process for comparing a new face signature to appropriate face signatures for each of the existing players that have been enrolled with the current video game or application. The process of FIG. 14 is one example implementation of step 390 of FIG. 8. In step 600, the system access a signature for the next player ID. As mentioned above, each player enrolled in an application/game is assigned a player ID. The next player ID to be considered is accessed in step 600. For example, if this is the first time step 600 is being performed in the current instantiation of the process of FIG. 14, then the system will access signatures for the first player enrolled. In step 602, the system will compute the matching score between the newly created face signature for the person entering the play space and the accessed signatures for the current ID under consideration using an L1 metric. The result of the L1 metric is a sum of absolute differences between each of the corresponding coefficients for the multi-dimensional vectors. If a given ID has more than one stored face signature, then in step 604 the system chooses the best signature for the current ID. For example, the system can choose the signature with the lowest L1 metric or the signature associated with a facial orientation closest to the orientation for the new player.

That sum that resulted from the L1 metric for the signature chosen in step 604 is compared to two thresholds. For example, FIG. 15 shows a range of sums with two thresholds: threshold 650 between positive and unknown; and threshold 652 between unknown and negative. If the sum of absolute differences is less than threshold 650, then there exists a positive match between the person who just entered the play space and the enrolled player currently under consideration. That is, the system assumes that the new face signature matches the face signature stored for the enrolled player. If the sum is equal to 0 then the two signatures match perfectly. If the sum of the differences is greater than threshold 652, then there exists a negative match, meaning that the newly created face signature for the person detected to have just entered the play space does not match this particular stored face signature for the enrolled player currently under consideration. If the sum of differences from the L1 metric is greater than threshold 650 but less than threshold 652, then it is unknown for this technique if there is a match.

Looking back at step 606 of FIG. 14, the system determines whether the particular signature under consideration has a positive match (step 608), unknown match (step 610) or a negative match (step 612) with respect to the newly created face signature of the person detected to have just entered the play space. After classifying the currently accessed face signature for the currently accessed player ID, the system determines that whether there are more enrolled players (and, therefore, more enrolled player ID's) to consider in step 626. If not, the process of FIG. 14 is complete. If there are more enrolled players to consider (e.g., more enrolled players to consider) then the process loops back to step 600 and considers the next enrolled player ID, and the process continues as described above.

FIG. 16 is a flow chart describing one embodiment of a process for comparing clothing signatures. The process of FIG. 16 is one example implementation of step 392 of FIG. 8. In step 660 of FIG. 16, the next enrolled player ID for the set of enrolled players is accessed (see discussion above with respect to step 600). In step 662, the system will access all the clothing signatures for that player ID and then filter them by location. Looking back in FIG. 12, when the signatures were created, the system determined and stored the location of the new player who entered the play space at the time the clothing signatures were created. In one embodiment, for each enrolled player, there will be multiple sets of signatures. Each set of signatures will correspond to a different location in the play space. It is contemplated that the play space may have different lighting or other environmental factors. These changes in environment may affect the signatures. Therefore, the system may keep a separate set of clothing signatures for different locations. Step 662 includes filtering the signatures for a particular player ID to identify the set of one or more signatures closest in distance to the location of the player who recently entered the play space. In step 664, the system will compute an earth mover's distance between a particular signature for the person who just entered the play space and the corresponding signature accessed in step 662. If there is only one clothing signature accessed in step 662, the only on earth mover's distance is calculated. If step 662 accessed a signature for a shirt and a signature for pants, then step 664 will compute an earth mover's distance between the shirt signatures for the ID under consideration and the person who just entered the play space, and an earth mover's distance between the pants signatures for the ID under consideration and the person who just entered the play space. If step 662 also accessed a signature for a subregion of clothing for the ID under consideration and there exists a signature for a subregion of clothing for the for the person who just entered the play space, then a third earth mover's distance is calculated. In some embodiments, the signature for a subregion of clothing for the ID under consideration and the signature for a subregion of clothing for the person who just entered the play space are not compared in the process that also compares the pants and shirt signatures.

The earth mover's distance(s) is/are compared to two thresholds (see FIG. 15) at step 666. Based on that comparison, the system classifies the comparison(s) as positive, unknown, or negative. In step 668, it is determined whether any of the comparisons of step 666 had a negative result. If so, the overall score for the ID under consideration is negative (step 670). If none of the comparisons of step 666 had a negative result, then in step 672 it is determined whether any of the of step 666 had a positive result. If so, the overall score for the ID under consideration is positive (step 674). If none of the comparisons of step 666 had a positive result, then the overall score for the ID under consideration is unkown (step 676).

After steps 670, 674 and 676, the process continues at step 678. In step 678, the system determines whether there are any additional enrolled players (player ID's of enrolled players) that have not yet been evaluated. If there are no more enrolled players to consider, then the process of FIG. 16 is complete. If there are more enrolled players to consider, then the process loops back to step 660 and the system considers the next enrolled player.

In one embodiment, the process of FIG. 16 is performed for the shirt and pants signatures, and separately performed for the signatures associated with the subregions of unique color.

Figure 17:
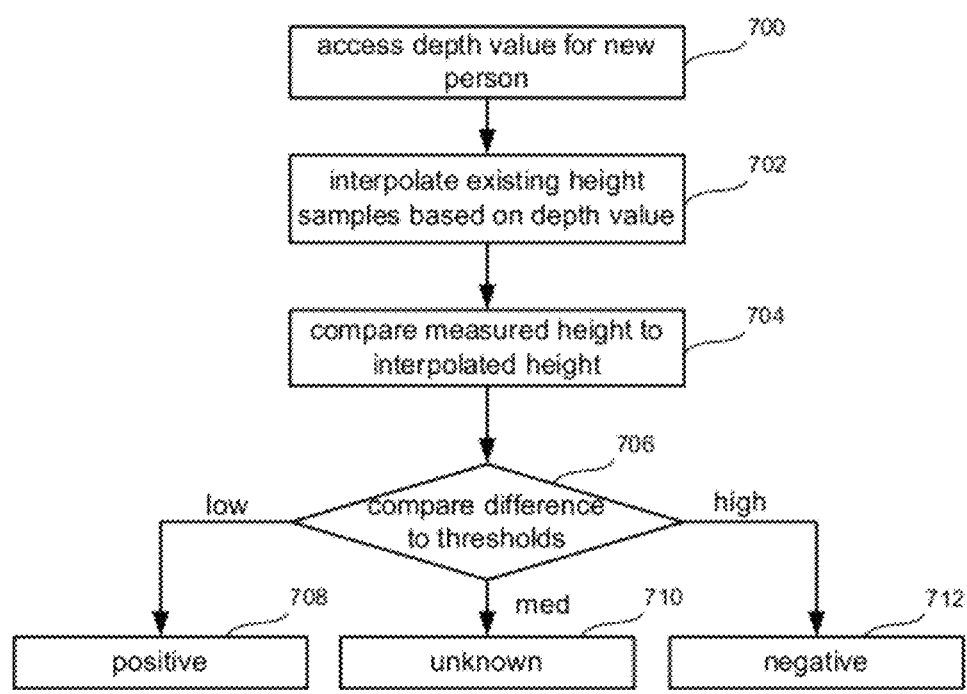
FIG. 17 is a flow chart describing one embodiment of a process for comparing signatures for height.

FIG. 17 is a flow chart describing one embodiment of a process for comparing height signatures. The process of FIG. 17 is one example implementation of step 394 of FIG. 8. The process of step 700 is performed once for each enrolled player. In step 700 in FIG. 17, the system will access a depth value for the new person who just entered the play space. That depth value is based on the skeleton (FIG. 10). As discussed above with respect to FIG. 13, when the height value is determined, the location of the skeleton at the time of determining the height value is also stored.

In step 702, the depth value accessed in step 700 is used to interpolate that person's height based on the stored height signature for the enrolled player under consideration. It is contemplated that the system will create multiple height value data points for each of the enrolled players. Height values may vary, for example, due to camera tilt, error in estimating the floor-normal or the gravity up from an accelerometer like device, or other reason. For example, as a players walks around different parts of the room in front of the sensor, multiple height values will be recorded. For each height value, the system will record the determined height of the player and the depth of the player. Based on those two pieces of information, the system can fit a curve or function to the data to create a mathematical function that best minimizes the error while characterizing the height data. In step 702, the depth value for the skeleton of the person who entered the play space is used to interpolate a height value from the curve or function that that best minimizes the error while characterizing the height data for the particular enrolled player.

In step 704, the interpolated height value from step 702 is compared to the height value calculated using the process of FIG. 13. This difference is compared to two thresholds (see FIG. 15) to determine whether the comparison results in a positive identification (step 708), unknown identification (step 710) or negative identification (step 712). The process of FIG. 17 is repeated for each of the enrolled players; therefore, the newly created signature using the method of FIG. 13 is compared against each of the enrolled players using the process of FIG. 17.

Figure 18:
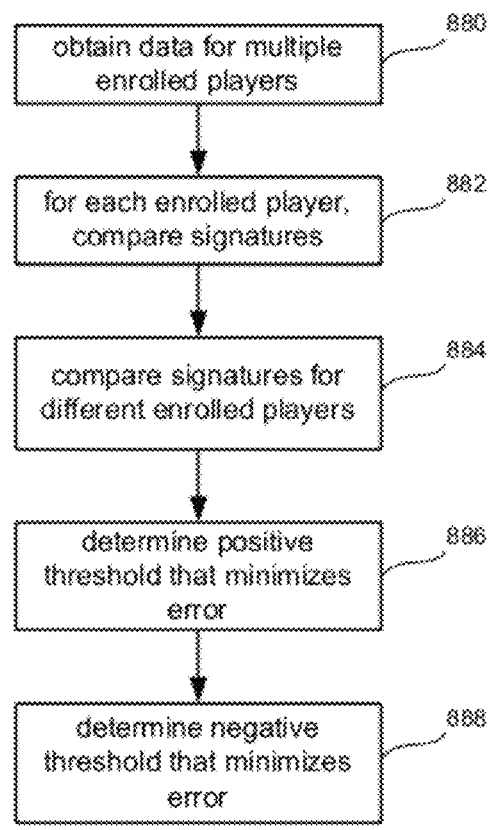
FIG. 18 is a table that depicts an example of matching a set of signatures to an identity

After the process of FIG. 8 is performed (e.g., using the processes of FIGS. 14, 16 and 17), the system now has a positive, negative, or unknown score for face, clothing, and height with respect to the new person who entered the play space and each enrolled player. Therefore, if there are four enrolled players, there are 12 scores. FIG. 18 is a table showing an example set of scores resulting from performance of the process of FIG. 8 (using the processes of FIGS. 14, 16 and 17) for four enrolled players.

The system will apply a set of rules in order to match one of the enrolled players to the new person who entered the play space. In one embodiment, the system will apply the following three rules:

1. The responses for the matched enrolled player can only be positive or unknown, never negative;
2. There must be at least one positive response for the matched enrolled player; and
3. Filter down—first by face, second by clothing and third by height. Within each level, only one candidate can be positive, otherwise all positives are treated as unknowns.

In one embodiment, the face comparison will override the other comparisons since we want to allow re-identification if the player decides to change his/her clothing color by taking off or adding a layer of clothing during gameplay or otherwise changing clothing. In one implementation, the greater emphasis on the face comparison only applies if there is only a single face positive and that face score is good enough (possibly required to be even better than the Positive threshold). In one embodiment, the score for the subregion of clothing (see step 520 of FIG. 12) can be compared separately (if available) after the signatures for clothing and prior to the signatures for height in the third rule listed above.

When applying these rules to the data of FIG. 18, the systems starts by comparing the face score. Since two of the face scores are positive, they are both treated as "unknown." The face score for enrolled player #2 is Negative, so enrolled player 2 is out of consideration. Second, the clothing scores are compared, which eliminates enrolled players 3 and 4. The height score for enrolled player 1 is positive and enrolled player 1 is the only candidate not eliminated; therefore, the system determines that the new person who entered the play space matches enrolled player #1. The system will assign the new person who entered the play space to be enrolled player 1. Going forward, the new person who entered the play space will control the avatar or objects that can be controlled by enrolled player 1. In one embodiment that has a separate score for the subregion of clothing (see step 520 of FIG. 12), the table of FIG. 18 would include another row for the subregion scores.

Figure 19:
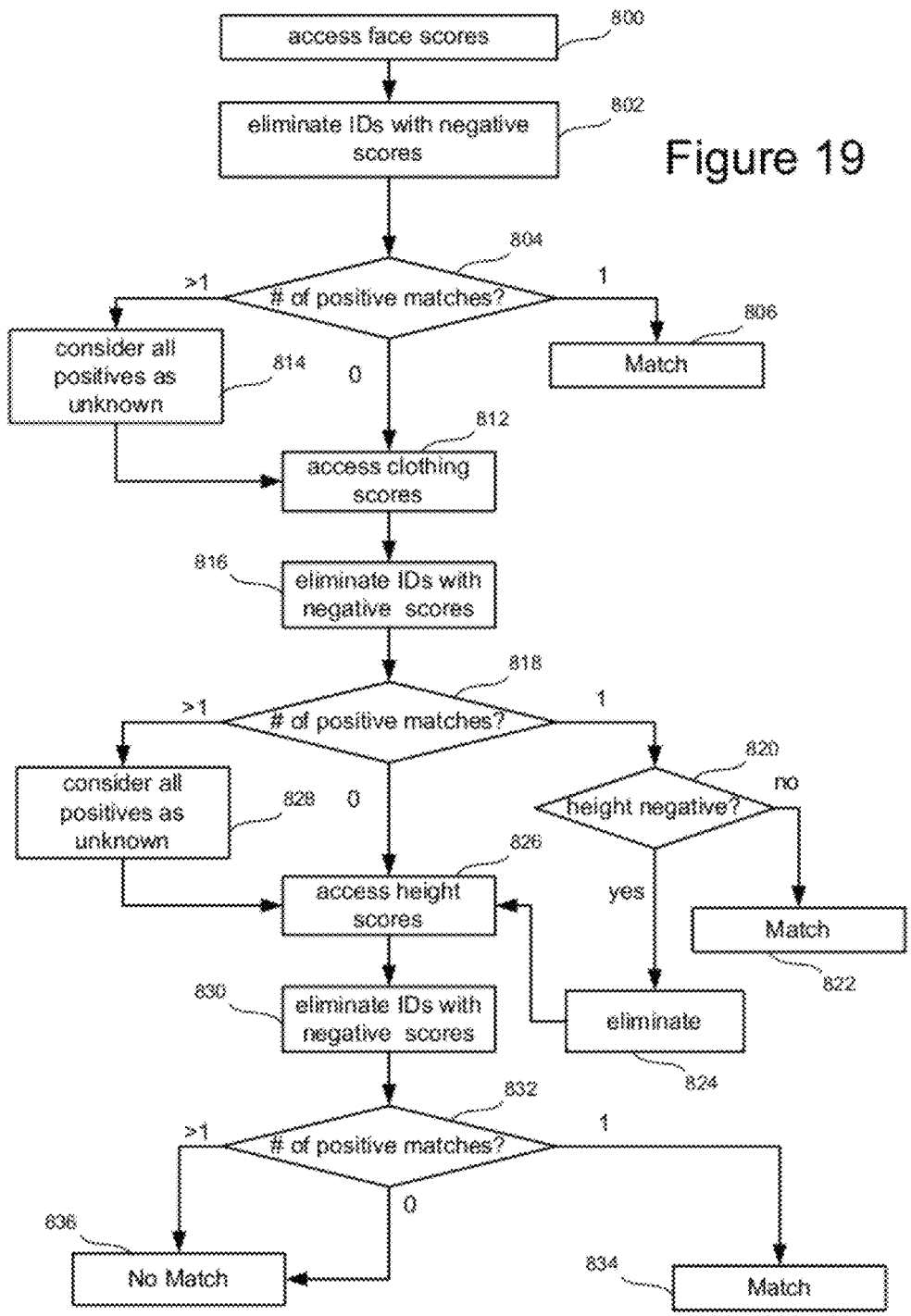
FIG. 19 is a flow chart describing one embodiment of a process for matching a set of signatures to an identity.

FIG. 19 is a flow chart describing one embodiment of a process for determining which of the enrolled players, if any, the new person who entered the play space corresponds to based on the signatures created using the process of FIG. 7 and compared against the enrolled players using the process of FIG. 8 to create the scores (e.g., see FIG. 18). The process of FIG. 19 is one embodiment of step 354 of FIG. 6 and is an example implementation of the three rules described above.

In step 800 of FIG. 19, the system will access the face scores. For example, looking back at FIG. 18, the system access the positive score for player 1, negative score for player 2, positive score for player 3 and the unknown score for player 4. In step 802, the system will eliminate all enrolled players with negative face scores. If the elimination of all enrolled players with negative face scores results in an empty candidate set, the system will early terminate with no match. In step 804, the system determines how many face scores were positive. If there is only one positive score, then in step 806 the system will conclude that the ID with the positive score is the match for player who just entered the play space. The system does not then check the clothing scores and height. Such a method allows for matching when a player removes or adds an article of clothing. For example, if a player removes a sweater the player may still get matched if the face score is positive. In another embodiment, of the face score is a strong positive then the system does not then check the clothing scores and height scores; however, if the face score is a weaker positive then the system does subsequently check the clothing scores and height scores.

Looking back at step 804, if it is determined that the number of positive scores was greater than one, then all positives are now considered to be unknown in step 814 and the process continues to step 812. If the number of positive matches (step 804) is zero, then the system will access the clothing scores in step 812.

After accessing the clothing scores, the system will eliminate all enrolled players with negative clothing scores in step 816. If the elimination of all enrolled players with negative clothing scores results in an empty candidate set, the system will early terminate with no match. In step 818, the system will determine the number of positive scores for the clothing. If the number of positive scores is exactly one, then the system determines whether that particular enrolled player having the positive score has a negative score for height in step 820. If that particular enrolled player does not have any negative scores, then that particular enrolled player is matched to the person who just entered the play space at step 822. If particular enrolled player does have a negative score, then that particular enrolled player is eliminated at step 824 and this process continues at step 826. If the number of positive scores determined at step 818 is greater than one, the system will consider all positive scores for the clothing to be unknown in step 828 and the process continues at step 826. If the number of positive matches in step 818 is determined to be zero, then the system will access the height scores in step 826.

In step 830, any enrolled ID that has a negative height score for height is eliminated. If the elimination of all enrolled players with height face scores results in an empty candidate set, the system will terminate with no match. At step 832, the system determines the number of positive scores for height. If there is exactly one positive score, then that enrolled player is the matching enrolled player to the person who just entered the play space (step 834); otherwise, there is no match (step 836). Therefore, at the end of the process of FIG. 19, the system will either return the ID of the enrolled player matched to the person who just entered the play space or the system will return a "no match."

In one embodiment that has a separate score for the subregion of clothing (see step 520 of FIG. 12), the process of FIG. 19 can be modified so that prior to step 826 the system will compare scores for the subregion of clothing (if available). If there are any negative scores, those IDs will be eliminated. If there are more than one positives, they will be treated as unknowns. If there is only one positive, that ID will be the match if the height score for that ID is not negative. If a matech is not made, then the system will continue at step 826.

As discussed above with respect to FIG. 5, if no match is determined, then the system will assign a new ID to that player and the application will decide what to do with the new player. If the system performing the process at FIG. 19 returns an ID of an existing enrolled player, then the new person who entered the play space will be mapped to the ID for the matched enrolled player (step 312 of FIG. 5) and then that person will then interact with a video game/application as the existing the enrolled player. For example, the new person entering the place space will be able to control an avatar of an existing player in a game to interact with objects or other entities in the game/application.

Looking back at FIG. 5, step 316 includes refining (e.g., dynamically updating) the thresholds discussed above (see, e.g., FIG. 15). FIG. 20 is a flow chart describing one embodiment for refining the thresholds. That is, the process of FIG. 20 is one example of implementation of step 316. In step 880 of FIG. 20 the system will obtain data from multiple enrolled players. For example, the system will create face, clothing, and height signatures for many players over a period of time using the processes described above. In step 882, the system will compare signatures for the same enrolled player. That is, for each enrolled player, the system will compare all of the signatures for that enrolled player with the face, compare all the signatures of that enrolled player for clothing and then compare the signatures for that enrolled player for height. However, the comparison is limited in that only overlapping signatures will be compared. The system attempts to determine the deviation of data for each particular enrolled. For example, a standard deviation (or other measure) can be computed. In step 884, the system compares signatures for different enrolled players and determines deviation data between enrolled players. For example, a standard deviation (or other measure) can be computed. Based on that deviation data, the system determines a threshold 652 between unknown and negative matches in step 888. In one embodiment, the system can obtain the data while performing the video game/application using the enrolled players. In another embodiment, the system can obtain the data when not playing a video game by asking the players to pose in certain positions. In step 888, all of the deviations for all the enrolled players (see step 882) will be compared to determine a threshold 650 between positive and unknown so that all or most of the signatures for an enrolled player would be considered a positive match.

The process of FIG. 20 can also be performed in a laboratory or in a simulation prior to manufacture of the system in order to perform step 300 of FIG. 5, which includes establishing the initial set of thresholds. Although this data will not be based on the particular home user's input, it is a good starting point which can be dynamically updated in step 316 of FIG. 5.

Figure 21:
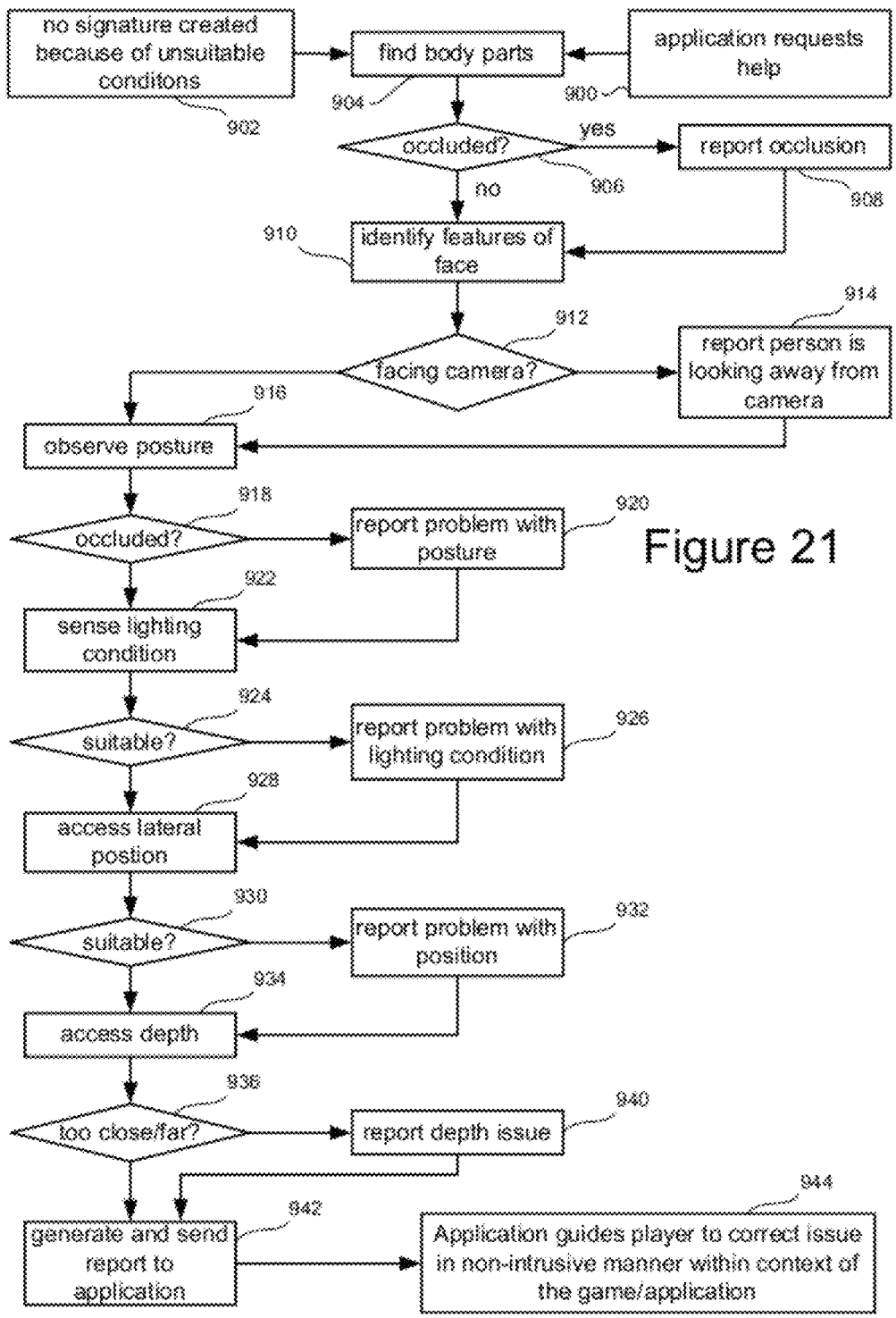
FIG. 21 is a flow chart describing one embodiment of a process for improving the data used to create signatures.

When creating the signatures for the process of FIG. 20 or otherwise, or in response to conditions not being suitable for creating signatures, the visual identification and tracking module 194 may provide guidance to application 196 (see FIG. 12) to improve the data gathered and used for signatures. FIG. 21 is a flow chart describing one embodiment of a process for improving the data gathering for creating signatures. The process of FIG. 21 is started in response to application 196 requesting help with obtaining signatures (step 900), the system being unable to obtain signatures because the conditions were not suitable (step 902), as discussed above, or other reasons. In step 904 of FIG. 21, the system will attempt to identify all body parts of a skeleton under consideration for signature creation using one or more depth images and/or visual images. If any of the body parts are occluded (step 906), then that occlusion is reported in step 908. In step 910, the system attempts to identify the features of the face (e.g., eyes, nose, mouth). Based on identification, the system determines whether the person is facing the camera in step 912. If the person is not facing the camera, then the system will report that the person is looking away from the camera in step 914.

In step 916, the system will observe the person's posture based on the skeleton returned from the depth images. If the person is not standing straight, then the problem with the posture will be reported in 920. At step 922, the lighting conditions are sensed. For example, the system may determine whether the lights are too bright or too dim. If the lighting is not suitable, then the lighting problem is reported in step 926. In step 928, the system determines whether the lateral position of the skeleton is a problem. For example, if the person is too close to the edge of the room or any location known to have problems, that information can be reported in step 932. In step 934, the system determines the depth of the person. If the person is too deep or too close (step 936), then the problem with the person's depth is reported at step 940. In step 942, the system will generate a report based on all the problems reported in steps 908, 914, 920, 926, 932 and 940. That report is sent to application 196 as part of step 942. In step 944, application 196 receives the report and guides the player in order to correct issues in a non-intrusive manner within the context of the game/application. For example, the system may cause an object to move in the video game to cause the player to change positions, poses, etc. so that the problems reported are corrected. Note that if the system is trying to identify or gather more signatures for the player without an explicit request from the application, then the system will silently fail if the conditions are not suitable for creating signatures so that there is no interference with gameplay.

Looking back at FIG. 5, step 302 includes enrolling the players in the application/game. In one embodiment the system will ask the user to input the number of players and then sequentially ask each player to identify themselves. For each player, the system will ask the player to strike various poses in various locations in order to generate the necessary signatures discussed above. Since lighting may vary depending on the location of the player in the room, one embodiment includes capturing multiple images of the players' clothing at multiple locations to create multiple signatures for the different locations and indexing them based on the player's world space location. Similar approaches for bucketing and replacing existing signatures can be used. The signature can include a world space location. The set of signatures are divided and grouped into buckets based on proximity of world space locations associated with each sample. A new signature is stored into the bucket that is associated with signatures closest to its location. Or, a new signature replaces an existing signature in the bucket that is associated with signatures closest to its location. In one embodiment, a new signature replaces an old one that has the shortest summation of distances to all existing samples.

When enrolling an identity, one example technique includes getting multiple snapshots of the face, in various orientations. One approach includes defining a cone of supported facial orientations (facial normals). Within that cone, the system defined a discrete set of preferred orientations which are dense around the center and become sparse along the edges of the cone. Once the system gets a new face signature, the system will employ various heuristics to decide if the face is good enough and is fully visible (e.g., skeleton position and exemplar labeling are two such embodiments). If so, the system calculates the face normal and finds the closest entry in a discrete set of facial orientations. In one embodiment, only new normalized snapshots are added if the system does not already have a snapshot for that orientation. However, another possible embodiment may support replacing an existing snapshot if the new face signature is better given some scoring metric.

Another embodiment for enrolling the identity and getting multiple face signatures includes keeping a fixed number of face signatures for enrolling the identity and collecting those face samples during skeleton tracking. When a new face sample is available, it replaces the old one that has the shortest summation of distances (measured in PCA space) to all existing samples. In this way, the system obtains a set of samples that are as far apart as possible; therefore, spanning a large and complete face space for that identity.

In another embodiment, if the game/application enroll players at one time prior to the game or application starting, the system can keep getting samples for the various players in front of the sensor. When the game/application identifies that it wants to enroll a certain player, the data for that player will already be stored. The system can take the set of K data values that are furtherest from each other to provide a good set of data samples.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method of configuring interaction between a set of already enrolled players and a computer based application, comprising:

executing the computer based application using a computing system, the computer based application interacting with one or more players of the set of the already enrolled players who are physically co-located in a physical real-world play space, the already enrolled players are users of the computing system wherein the computing system previously identified the set of already enrolled players using a sensor system by having detected one or more physical features of each of the set of already enrolled players with respect to one or more tracked locations in the physical real-world play space and having generated and having stored, for each of the set of already enrolled players, one or more stored visual signatures of the detected one or more physical features for each tracked location;

automatically, via the sensor system and the computing system, determining that a person has become detectable in the physical real-world play space, wherein the person that has become detectable in the physical real-world play space is not one of the one or more players of the set of the already enrolled players currently interacting with the computer based application in the physical real-world play space;

automatically via the computing system and the sensor system, detecting one or more physical features of the person and tracking one or more locations in the physical real-world play space of the detected one or more physical features of the person, generating one or more respective visual signatures of the detected one or more physical features of the person for each tracked location, identifying whether the person is a specific already enrolled player of the set of already enrolled players based on comparing the one or more respective visual signatures to the one or more stored visual signatures of the set of already enrolled players, and responsive to the one or more stored visual signatures of a specific already enrolled player matching the one or more respective visual signatures of the person, concluding that the person is the specific already enrolled player of the set of already enrolled players; and mapping the person to the specific already enrolled player and interacting with the person using the computer based application running on the computing system based on the mapping.

2. The method of claim 1, wherein:
the automatically identifying the person that has become detectable in the real-world play space as a specific already enrolled player of the set of already enrolled players includes visually identifying the person as the specific already enrolled player.

3. The method of claim 1, further comprising:
sensing visual data of the person using the sensor system; and
sensing depth data of the person using the sensor system, the automatically identifying the person as a specific enrolled player of the set of already enrolled players is based on the visual data and the depth data, the depth data includes a two dimensional depth image with pixels of the depth image each having magnitudes that represent distance from the sensor system.

4. The method of claim 1, further comprising:
establishing thresholds, the thresholds are used when automatically identifying the person that has become detectable in the real-world play space as a specific already enrolled player of the set of already enrolled players; and
dynamically updating the thresholds while and based on performing the computer based application.

5. The method of claim 1, further comprising:
receiving visual data and depth data from the sensor system; and
wherein generating one or more respective visual signatures of the detected one or more physical features of the person for each tracked location further comprises
creating a set of visual signatures of the person for each tracked location indicative of appearance of the person based on the visual data and depth data, the set of visual signatures are created by applying one or more mathematical functions to the visual data to create a mathematical representation of the visual data.

6. The method of claim 5, wherein:
the creating the set of visual signatures of the person for each tracked location includes creating a signature for an appearance of the person's face, creating a signature for an appearance of the person's clothing and creating a signature for the person's height; and
the detected physical features of the person includes arrangement of the person's face, color of the person's clothing and the person's height.

7. The method of claim 6, wherein identifying the person as a specific already enrolled player of the set of already enrolled players based on comparing the one or more respective visual signatures to the one or more stored visual signatures of the set of already enrolled players and concluding that the person is the specific already enrolled player of the set of already enrolled players having the one or more stored visual signatures that closest match the one or more respective visual signatures of the person further comprises:

(a) determining whether the signature for the appearance of the person's face corresponds to stored signatures for each tracked location for faces of any of the set of enrolled players;

(b) determining whether the signature for the appearance of the person's clothing corresponds to stored signatures for each tracked location for clothing of any of the set of enrolled players;

(c) determining whether the signature for the person's height corresponds to stored signatures for each tracked location for height of any of the set of enrolled players; and making an aggregate decision as to whether the person is the specific enrolled player based on steps (a), (b) and (c).

8. The method of claim 1, wherein:
the interacting with the person based on the mapping includes controlling an avatar in a video game based on motion of the person and outputting display signals indicating the video game with the avatar.

9. The method of claim 1, wherein the computer based application is a video game, the method further comprises:
determining that insufficient data exists for identifying the person;
requesting the person to perform a specific act of motion as part of the video game in response to determining that insufficient data exists for identifying the person; and visually detecting sufficient data in response to the specific act.

10. A video game apparatus, comprising:
an interface to a display;
a sensor system;
a memory; and
one or more processors in communication with the interface and the sensor system and having access to the memory;
the one or more processors establish thresholds, enroll players in a video game including identifying users of the video game apparatus as members of a set of already enrolled players, wherein the one or more processors previously identified the set of already enrolled players using a sensor system by having detected one or more physical features of each of the set of already enrolled players with respect to one or more tracked locations in a physical real-world play space and having generated and having stored in the memory, for each of the set of already enrolled players, one or more stored visual signatures of the detected one or more physical features for each tracked location;
the one or more processors execute the video game including interacting with one or more of the already enrolled players in the physical real-world play space based on the enrolling, and determine that a person has become detectable in the physical real-world play space of the video game;
the one or more processors automatically determine based on data from the sensor system whether the person that has become detectable in the physical real-world play space is one of the set of already enrolled players by
detecting one or more physical features of the person and tracking one or more locations in the physical real-world play space of the detected one or more physical features of the person,
generating one or more respective visual signatures of the detected one or more physical features of the person for each tracked location,
identifying whether the person is a specific already enrolled player of the set of already enrolled players based on comparing the one or more respective visual signatures to the one or more stored visual signatures of the set of already enrolled players,
responsive to the one or more stored visual signatures of a specific already enrolled player matching the one or more respective visual signatures of the person, concluding that an identification of the person is the identification of the specific already enrolled player of the set of already enrolled players, and
responsive to no match between the one or more respective visual signatures of the person and the one or more stored visual signatures for the set of already enrolled players, assigning a new identification as the identification of the person and interacting with the person in the video game based on the new identification if it is determined that the person is not one of the enrolled players, and
mapping the person to the identification of the person, and interacting with the person in the video game based on the mapping.

11. The video game apparatus of claim 10, wherein:
the sensor system senses visual data of the person and depth data of the person, the one or more processors automatically determine whether the person is one of the enrolled players based on the visual data and the depth data.

12. The video game apparatus of claim 10, wherein:
the one or more processors dynamically update the thresholds while executing the video game.

13. The video game apparatus of claim 10, wherein:
at least one of the one or more respective visual signatures of the person is generated using depth data from the sensor system, the depth data includes a two dimensional depth image with pixels having magnitudes that represent distance from the sensor system.

14. The video game apparatus of claim 13, wherein:
the one or more respective visual signatures of the person includes a visual signature for an appearance of the person's face, a visual signature for an appearance of the person's clothing and a visual signature for the person's height.

15. The video game apparatus of claim 10, wherein:
the one or more processors interact with the person in the video game by controlling an avatar in the video game based on motion of the person.

16. One or more processor readable storage devices having processor readable code embodied on said one or more processor readable storage devices, said processor readable code for programming one or more processors to perform a method comprising:
receiving visual data and depth data from one or more sensors pertaining to a first entity in a physical real world space, the first entity not currently interacting with an application, the depth data includes a two dimensional depth image with pixels of the depth image each having a magnitude that represents a distance from the one or more sensors;
detecting one or more physical features of the first entity and tracking one or more locations in the physical real-world space of the detected one or more physical features of the first entity;
creating a first set of visual signatures of the detected one or more physical features of the first entity for each tracked location based on the visual data and depth data, the first set of visual signatures are created by applying one or more mathematical functions to the visual data and depth data to create a mathematical representation of the visual data and depth data;
determining whether the first set of visual signatures for each tracked location of the first entity not currently interacting with the application matches at least one of previously created stored sets of visual signatures for each tracked location for one or more entities already enrolled for the application based on comparing the first set of visual signatures for each tracked location of the first entity not currently interacting with the application to the previously created stored sets of visual signatures for each tracked location for the one or more entities already enrolled for the application; and
responsive to the first set of visual signatures for each tracked location of the first entity not currently interacting with the application matching the at least one of the stored sets of visual signatures, mapping the first entity to the at least one entity already enrolled for the application associated with the at least one of the stored sets of visual signatures, the mapping allows the first entity to interact with the application.

17. One or more processor readable storage devices according to claim 16, wherein:
the first set of visual signatures for each location includes a signature for an appearance of the first entity's face, a signature for an appearance of the first entity's clothing and a signature for the first entity's height.

* * * * *